US012672073B2

(12) United States Patent
Ruan et al.

(10) Patent No.: US 12,672,073 B2
(45) Date of Patent: Jun. 30, 2026

(54) POWER CONTROL METHOD IN WIRELESS LOCAL AREA NETWORK AND RELATED APPARATUS

(71) Applicant: HUAWEI TECHNOLOGIES CO., LTD., Shenzhen (CN)

(72) Inventors: Wei Ruan, Shanghai (CN); Jian Yu, Shenzhen (CN); Cong Chen, Shanghai (CN); Chenchen Liu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 403 days.

(21) Appl. No.: 18/330,323

(22) Filed: Jun. 6, 2023

(65) Prior Publication Data

US 2023/0319732 A1      Oct. 5, 2023

Related U.S. Application Data

(63) Continuation of application No. PCT/CN2021/136298, filed on Dec. 8, 2021.

(30) Foreign Application Priority Data

Dec. 11, 2020    (CN) .......................... 202011445480.4

(51) Int. Cl.
| | |
|---|---|
| *H04W 52/24* | (2009.01) |
| *H04W 16/28* | (2009.01) |
| *H04W 52/54* | (2009.01) |

(52) U.S. Cl.
CPC ......... *H04W 52/245* (2013.01); *H04W 16/28* (2013.01); *H04W 52/241* (2013.01); *H04W 52/54* (2013.01)

(58) Field of Classification Search
CPC ..... H04W 84/12; H04W 16/28; H04W 84/18; H04W 48/12; H04W 72/23; H04W 52/26; H04W 52/34; H04W 52/10; H04W 72/0473; H04W 52/245
See application file for complete search history.

(56) References Cited

U.S. PATENT DOCUMENTS

| | | | |
|---|---|---|---|
| 2020/0112350 A1 | 4/2020 | Yang et al. | |
| 2024/0022454 A1* | 1/2024 | Merlin | ................ H04L 25/0224 |

FOREIGN PATENT DOCUMENTS

| | | |
|---|---|---|
| CN | 103108383 A | 5/2013 |
| CN | 107852617 A | 3/2018 |
| CN | 110034803 A | 7/2019 |
| CN | 111030742 A | 4/2020 |
| CN | 111049558 A | 4/2020 |
| CN | 111628809 A | 9/2020 |

* cited by examiner

*Primary Examiner* — Tu X Nguyen

(57) ABSTRACT

In a power control method in a wireless local area network, a beamformer sends a null data packet (NDP) via a plurality of spatial streams to beamformees. After receiving the NDP, a beamformee determines a first parameter for power control based on RSSIs of a plurality of receive antennas when the beamformee receives the NDP, or based on SNRs of a plurality of spatial streams when the beamformee receives the NDP. The beamformee then generates a beamforming report comprising the first parameter, and sends the beamforming report to the beamformer.

20 Claims, 8 Drawing Sheets

SNR: signal to noise ratio Antenna In: antenna input Gain: gain
ADC SNR: analog to Digital Convert SNR, analog to digital signal to noise ratio
lna Gain: low noise amplifier low noise amplifier gain
vga Gain: variable gain amplifier variable gain amplifier gain
tot Gain: total gain total gain

POWER CONTROL METHOD IN WIRELESS LOCAL AREA NETWORK AND RELATED APPARATUS

CROSS-REFERENCE TO RELATED APPLICATIONS

This application is a continuation of International Application PCT/CN2021/136298, filed on Dec. 8, 2021, which claims priority to Chinese Patent Application 202011445480.4, filed on Dec. 11, 2020. The disclosures of the aforementioned applications are hereby incorporated by reference in their entirety.

TECHNICAL FIELD

This application relates to the field of wireless communication technologies, and in particular, to a power control method in a wireless local area network and a related apparatus.

BACKGROUND

A wireless local area network (wireless local area network, WLAN) has been developed for many generations, including 802.11a/b/g, 802.11n, 802.11ac, 802.11ax, and 802.11be under discussion. 802.11a/b/g supports only single-spatial stream transmission and does not support multiple-input multiple-output (MIMO) transmission. 802.11n supports MIMO transmission of a maximum of four space-time streams. All space-time streams may use different modulation and coding schemes (MCSs) to adapt to signal to noise ratios (SNRs) of different space-time streams. 802.11ac and 802.11ax support a maximum of eight space-time streams, and different MCSs are not considered for different spatial streams. Both different spatial streams and space-time block coding (STBC) in a time dimension are considered in the space-time streams. When a transmit end does not use STBC, a number of space-time streams is equal to a number of spatial streams. STBC is not considered in the 802.11be standard (also referred to as an extremely high throughput (EHT) standard). Therefore, the 802.11be standard focuses on spatial streams, and supports a maximum of 16 spatial streams.

In terms of modulation and coding, a modulation order considered in each generation of standard gradually increases. 802.11ac supports up to 256-order quadrature amplitude modulation (QAM), 802.11ax supports up to 1024-order QAM, and in 802.11be, 4096-order QAM is further considered. Higher-order QAM modulation may support a higher data rate but also has a higher requirement on a signal to noise ratio.

Therefore, how to support a higher-order modulation scheme in a case of a larger number of spatial streams to achieve a large number of spatial streams and a high modulation order becomes an urgent problem to be resolved.

SUMMARY

Embodiments of this application provide a power control method in a wireless local area network and a related apparatus, to support a higher-order modulation scheme in a case of a larger number of spatial streams, to achieve a large number of spatial streams and a high modulation order. This improves a system throughput.

The following describes this application from different aspects. It should be understood that mutual reference may be made to the following implementations and beneficial effect of the different aspects.

According to a first aspect, this application provides a power control method in a wireless local area network. In the method, a beamformer sends a null data packet (NDP) by using a plurality of spatial streams. The beamformer receives a beamforming report. The beamforming report includes a first parameter. The first parameter is determined based on received signal strength indicators (RSSIs) of a plurality of receive antennas when a beamformee receives the NDP. Alternatively, the first parameter is determined based on signal to noise ratios (SNRs) of a plurality of spatial streams when the beamformee receives the NDP. The first parameter is used for power control.

Optionally, after the beamformer receives the beamforming report, the method further includes: The beamformer determines power control parameters of the plurality of spatial streams based on the first parameter and sends a data signal based on the power control parameters.

In this solution, the first parameter is fed back in the beamforming report, so that the beamformer determines the power control parameter of each spatial stream based on feedback in the beamforming report, and adjusts, based on the power control parameter, transmit power of each spatial stream when data is subsequently sent (or performs power control on the subsequently sent data), to support a higher-order modulation scheme in a case of a larger number of spatial streams, to achieve a large number of spatial streams and a high modulation order. This improves a system throughput.

With reference to the first aspect, in a possible implementation, before the beamformer sends the NDP, the method further includes: The beamformer sends a null data packet announcement (NDPA) frame. The NDPA frame includes indication information. The indication information indicates to the beamformee whether to feed back the first parameter.

In this solution, whether the beamformee needs to feed back the first parameter is indicated in the NDPA frame, so that the beamformee may be specified to perform common channel sounding and feed back a common beamforming report, that is, the beamforming report does not carry the first parameter. Alternatively, the beamformee may be specified to perform special channel sounding and feed back the beamforming report including the first parameter in this solution. Therefore, a channel sounding process is more flexible. In addition, the indication information is carried in the NDPA frame to indicate whether to feed back the first parameter, so that the beamformee may earlier determine whether to obtain the first parameter, and may directly obtain the first parameter after subsequently receiving the NDP.

According to a second aspect, this application provides a power control method in a wireless local area network. In the method, a beamformee receives an NDP. The beamformee sends a beamforming report. The beamforming report includes a first parameter. The first parameter is determined based on RSSIs of a plurality of receive antennas when the beamformee receives the NDP. Alternatively, the first parameter is determined based on SNRs of a plurality of spatial streams when the beamformee receives the NDP. The first parameter is used for power control.

It should be understood that, before the beamformee sends the beamforming report, the beamformee obtains the first parameter. A manner in which the beamformee obtains the first parameter may be that: The first parameter is determined based on the RSSIs of the plurality of receive antennas when the beamformee receives the NDP. Alternatively, the first parameter is determined based on the SNRs of the plurality of spatial streams when the beamformee receives the NDP.

Optionally, after the beamformee sends the beamforming report, the method further includes: The beamformee receives a data signal sent by a beamformer based on a power control parameter. The power control parameter is determined based on the first parameter.

With reference to the second aspect, in a possible implementation, before the beamformee receives the NDP, the method further includes: The beamformee receives an NDPA frame. The NDPA frame includes indication information. The indication information indicates to the beamformee whether to feed back the first parameter.

According to a third aspect, this application provides a communication apparatus. The communication apparatus may be a beamformer or a chip in the beamformer, for example, a Wi-Fi chip. The communication apparatus includes: a transceiver unit, configured to send an NDP. The transceiver unit is further configured to receive a beamforming report. The beamforming report includes a first parameter. The first parameter is determined based on RSSIs of a plurality of receive antennas when a beamformee receives the NDP. Alternatively, the first parameter is determined based on SNRs of a plurality of spatial streams when the beamformee receives the NDP. The first parameter is used for power control.

Optionally, the communication apparatus further includes a processing unit. The processing unit is configured to determine power control parameters of the plurality of spatial streams based on the first parameter. The transceiver unit is further configured to send a data signal based on the power control parameter.

With reference to the third aspect, in a possible implementation, the transceiver unit is further configured to send an NDPA frame. The NDPA frame includes indication information. The indication information indicates to the beamformee whether to feed back the first parameter.

According to a fourth aspect, this application provides a communication apparatus. The communication apparatus may be a beamformee or a chip in the beamformee, for example, a Wi-Fi chip. The communication apparatus includes: a transceiver unit, configured to receive an NDP. The transceiver unit is further configured to send a beamforming report. The beamforming report includes a first parameter. The first parameter is determined based on RSSIs of a plurality of receive antennas when the beamformee receives the NDP. Alternatively, the first parameter is determined based on SNRs of a plurality of spatial streams when the beamformee receives the NDP. The first parameter is used for power control.

It should be understood that the communication apparatus may further include a processing unit, configured to obtain the first parameter. The processing unit is specifically configured to: determine the first parameter based on the RSSIs of the plurality of receive antennas when the beamformee receives the NDP, or determine the first parameter based on the SNRs of the plurality of spatial streams when the beamformee receives the NDP.

Optionally, the transceiver unit is further configured to receive a data signal sent by a beamformer based on a power control parameter. The power control parameter is determined based on the first parameter.

With reference to the fourth aspect, in a possible implementation, the transceiver unit is further configured to receive an NDPA frame. The NDPA frame includes indication information. The indication information indicates to the beamformee whether to feed back the first parameter.

In an implementation of any one of the foregoing aspects, the first parameter includes the power control parameters of the plurality of spatial streams. The power control parameter is generated based on a first RSSI, a first RSSI threshold, and a first antenna index. The first RSSI is a largest RSSI of the plurality of receive antennas when the beamformee receives the NDP, the first antenna index is an index of a receive antenna corresponding to the first RSSI, and the first RSSI threshold is an RSSI threshold of the receive antenna corresponding to the first RSSI. The RSSI threshold is determined based on a low-noise amplifier characteristic of the receive antenna.

Optionally, a power control parameter of an $i^{th}$ spatial stream in the plurality of spatial streams is:

$$PC_i = f(RSSI_j - RSSIX_j).$$

$PC_i$ indicates the power control parameter of the $i^{th}$ spatial stream, a value of i falls within a range [1, N], and N is a number of spatial streams used when the beamformer sends the NDP. $f(\ )$ indicates a mapping function from a $j^{th}$ receive antenna to a spatial stream, $RSSI_j$ indicates an RSSI of the $j^{th}$ receive antenna, j is an index of a receive antenna with the largest RSSI when the beamformee receives the NDP, and $RSSIX_j$ indicates an RSSI threshold of the $j^{th}$ receive antenna. $f(\ )$ is determined based on channel state information of the $j^{th}$ receive antenna. The channel state information is determined based on a long training sequence in the NDP.

This solution provides a method for calculating a power control parameter of a spatial stream based on an RSSI of a receive antenna. Power control parameters of a plurality of spatial streams are fed back in the beamforming report, to help the beamformer adjust power of each spatial stream, to improve a signal to noise ratio of a spatial stream with an original worse SNR (which is a worse SNR in a channel sounding phase) when an SNR of a spatial stream with a good channel is not affected. In this way, a higher-order modulation scheme in a case of a larger number of spatial streams is supported, to achieve a large number of spatial streams and a high modulation order. This improves a system throughput.

In an implementation of any one of the foregoing aspects, the first parameter includes the power control parameters of the plurality of spatial streams. A power control parameter of an spatial stream in the plurality of spatial streams is determined based on an SNR of the $i^{th}$ spatial stream when the beamformee receives the NDP, a smallest SNR in the SNRs of the plurality of spatial streams when the beamformee receives the NDP, and a preset value.

Optionally, the power control parameter of the $i^{th}$ spatial stream meets the following condition:

$$SNR_i - PC_i \le SNR_{min} + \text{preset value}.$$

$SNR_i$ indicates the SNR of the $i^{th}$ spatial stream when the beamformee receives the NDP, a value of i falls within a range [1, N], N is a number of spatial streams used when the beamformer sends the NDP, $PC_i$ indicates the power control parameter of the $i^{th}$ spatial stream, and $SNR_{min}$ indicates the smallest SNR in the SNRs of the plurality of spatial streams when the beamformee receives the NDP. The preset value is a constant value selected based on implementation, for example, 5 dB.

This solution provides a method for calculating a power control parameter of a spatial stream based on an SNR of the spatial stream. Power control parameters of a plurality of spatial streams are fed back in the beamforming report, to help the beamformer adjust power of each spatial stream, to improve a signal to noise ratio of a spatial stream with an original worse SNR (which is a worse SNR in a channel sounding phase) when an SNR of a spatial stream with a good channel is not affected. In this way, a higher-order modulation scheme in a case of a larger number of spatial streams is supported, to achieve a large number of spatial streams and a high modulation order. This improves a system throughput. In addition, because an original beamforming report includes a compressed beamforming report field. The field includes an average SNR of each spatial stream. Therefore, in this solution, no additional measurement operation of a beamformee may be added, thereby saving power consumption.

In an implementation of any one of the foregoing aspects, the first parameter includes a first RSSI and a first receive antenna index. The first RSSI is a largest RSSI of the plurality of receive antennas when the beamformee receives the NDP. The first receive antenna index is an index of a receive antenna corresponding to the first RSSI.

Optionally, the first parameter further includes a first RSSI threshold. The first RSSI threshold is an RSSI threshold corresponding to the first receive antenna index.

In this solution, an RSSI and a corresponding radio frequency parameter (for example, RSSI thresholds of different receive antennas) that used to calculate a power control parameter are fed back in the beamforming report, so that the beamformer calculates a power adjustment parameter of each spatial stream based on feedback, and adjusts transmit power of each spatial stream, to appropriately reduce the RSSI of the receive antenna of the beamformee. This reduces total transmit power as a whole when an SNR of a spatial stream with good channel quality is not affected. In this way, at a receive end (that is, the beamformee), power of all spatial streams can be centrally amplified by using a power amplifier, to improve an SNR of a spatial stream with poor channel quality.

In an implementation of any one of the foregoing aspects, the NDP includes indication information indicating whether to feed back the first parameter. In this solution, whether the first parameter needs to be fed back is indicated in the NDP, so that a channel sounding process of the beamformee is more flexible and diversified.

According to a fifth aspect, this application provides a communication apparatus. The communication apparatus is specifically the beamformer in the first aspect, and includes a processor and a transceiver. The processor is configured to generate an NDP. The transceiver is configured to send the NDP. The transceiver is further configured to receive a beamforming report. The beamforming report includes a first parameter. The first parameter is determined based on RSSIs of a plurality of receive antennas when a beamformee receives the NDP. Alternatively, the first parameter is determined based on SNRs of a plurality of spatial streams when the beamformee receives the NDP. The first parameter is used for power control.

Optionally, the processor is configured to determine power control parameters of the plurality of spatial streams based on the first parameter. The transceiver is further configured to send a data signal based on the power control parameter.

According to a sixth aspect, this application provides a communication apparatus. The communication apparatus is specifically the beamformee in the second aspect, and includes a processor and a transceiver. The transceiver is configured to receive an NDP. The processor is configured to generate a beamforming report. The transceiver is further configured to send the beamforming report. The beamforming report includes a first parameter. The first parameter is determined based on RSSIs of a plurality of receive antennas when the NDP is received. Alternatively, the first parameter is determined based on SNRs of a plurality of spatial streams when the NDP is received. The first parameter is used for power control.

Optionally, the processor is further configured to receive a data signal sent by a beamformer based on a power control parameter. The power control parameter is determined based on the first parameter.

According to a seventh aspect, this application provides an apparatus. The apparatus is implemented in a product form of a chip, and includes an input/output interface and a processing circuit. The apparatus is a chip in the beamformer in the first aspect. The processing circuit is configured to generate an NDP. The input/output interface is configured to output the NDP, process the NDP through a radio frequency circuit, and send the NDP through an antenna. The input/output interface is further configured to input a beamforming report received through the antenna and the radio frequency circuit. The beamforming report includes a first parameter. The first parameter is determined based on RSSIs of a plurality of receive antennas when a beamformee receives the NDP. Alternatively, the first parameter is determined based on SNRs of a plurality of spatial streams when the beamformee receives the NDP. The first parameter is used for power control.

According to an eighth aspect, this application provides another apparatus. The apparatus is implemented in a product form of a chip, and includes an input/output interface and a processing circuit. The apparatus is a chip in the beamformee in the second aspect. The input/output interface is configured to input an NDP received through an antenna and a radio frequency circuit. The processing circuit is configured to generate a beamforming report. The input/output interface is further configured to: after outputting the beamforming report and processing the beamforming report through the radio frequency circuit, send the beamforming report through the antenna. The beamforming report includes a first parameter. The first parameter is determined based on RSSIs of a plurality of receive antennas when the NDP is received. Alternatively, the first parameter is determined based on SNRs of a plurality of spatial streams when the NDP is received. The first parameter is used for power control.

According to a ninth aspect, this application provides a computer-readable storage medium. The computer-readable storage medium stores program instructions, and when the program instructions are run on a computer, the computer is enabled to perform the power control method in a wireless local area network according to the first aspect or the second aspect.

According to a tenth aspect, this application provides a computer program product including program instructions. When the computer program product runs on a computer, the computer is enabled to perform the power control method in a wireless local area network according to the first aspect or the second aspect.

According to embodiments of this application, a higher-order modulation scheme in a case of a larger number of spatial streams can be supported, to achieve a large number of spatial streams and a high modulation order. This improves a system throughput.

BRIEF DESCRIPTION OF DRAWINGS

To describe the technical solutions in embodiments of this application more clearly, the following briefly describes the accompanying drawings used for describing embodiments.

DESCRIPTION OF EMBODIMENTS

The following clearly describes the technical solutions in embodiments of this application with reference to the accompanying drawings in embodiments of this application.

For ease of understanding the method provided in embodiments of this application, the following describes a system architecture of the method provided in embodiments of this application. It may be understood that the system architecture described in embodiments of this application is intended to describe the technical solutions in embodiments of this application more clearly, and do not constitute any limitation on the technical solutions provided in embodiments of this application.

An embodiment of this application provides a power control method in a wireless local area network. A power control parameter of each spatial stream may be fed back in a beamforming report, or a received signal strength indicator (RSSI) and a corresponding radio frequency parameter (for example, RSSI thresholds of different receive antennas) that are used to calculate the power control parameter may be fed back in the beamforming report, so that a beamformer adjusts, based on feedback in the beamforming report, transmit power of each spatial stream when data is subsequently sent (or performs power control on the subsequently sent data), to improve a signal to noise ratio of a spatial stream with an original worse SNR (which is a worse SNR in a channel sounding phase) when an SNR of a spatial stream with a good channel is not affected. In this way, a higher-order modulation scheme in a case of a larger number of spatial streams is supported, to achieve a large number of spatial streams and a high modulation order. This improves a system throughput. The power control method in a wireless local area network may be applied to a wireless communication system, for example, a wireless local area network system. The power control method in a wireless local area network may be implemented by a communication device in the wireless communication system or a chip or a processor in the communication device. The communication device may be an access point device or a station device. Alternatively, the communication device may be a wireless communication device that supports concurrent transmission on a plurality of links. For example, the communication device may be referred to as a multi-link device (MLD) or a multi-band device. Compared with a communication device that supports only single-link transmission, the multi-link device has higher transmission efficiency and a higher throughput.

Figure 1:
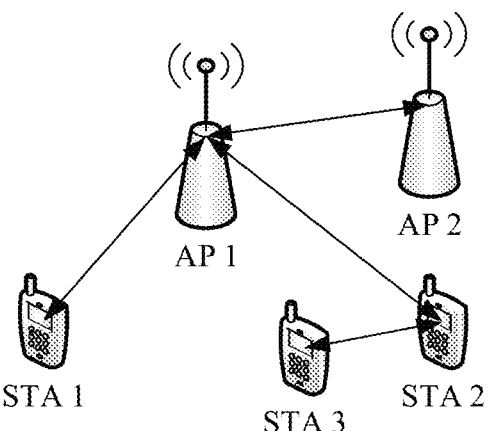
FIG. 1 is a schematic diagram of an architecture of a wireless communication system according to an embodiment of this application.

The power control method in a wireless local area network provided in embodiments of this application may be applied to a scenario in which an AP communicates with one or more STAs, may be alternatively applied to a scenario in which an AP communicates with another AP, and is also applicable to a scenario in which a STA communicates with another STA. FIG. 1 is a schematic diagram of an architecture of a wireless communication system according to an embodiment of this application. As shown in FIG. 1, the wireless communication system may include one or more APs (for example, an AP 1 or an AP 2 in FIG. 1) and one or more STAs (for example, a STA 1, a STA 2, or a STA 3 in FIG. 1). The AP and the STA support a WLAN communication protocol. The communication protocol may include IEEE 802.11be (or referred to as Wi-Fi 7, EHT protocol), and may further include protocols such as IEEE 802.11ax and IEEE 802.11ac. Certainly, the communication protocol may further include a next-generation protocol of IEEE 802.11be and the like with continuous evolution and development of communication technologies. A WLAN is used as an example. An apparatus for implementing the method in this application may be an AP or a STA in the WLAN, or a chip or a processing system installed in the AP or the STA.

An access point (for example, the AP 1 or the AP 2 in FIG. 1) is an apparatus having a wireless communication function, supports communication by using a WLAN protocol, has a function of communicating with another device (for example, a station or another access point) in a WLAN network, and certainly, may further have a function of communicating with another device. In a WLAN system, an access point may be referred to as an access point station (AP STA). The apparatus having the wireless communication function may be an entire device, or may be a chip or a processing system installed in the entire device. The device in which the chip or the processing system is installed may implement the method and the function in embodiments of this application under control of the chip or the processing system. The AP in embodiments of this application is an apparatus providing a service for a STA, and may support 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and the function in embodiments of this application.

A station (for example, the STA 1, the STA 2, or the STA 3 in FIG. 1) is an apparatus having a wireless communication function, supports communication by using a WLAN protocol, and has a capability of communicating with another station or an access point in a WLAN network. In the WLAN system, a station may be referred to as a non-access point station (non-access point station, non-AP STA). For example, the STA is any user communication device that allows a user to communicate with an AP and further communicate with a WLAN. The apparatus having a wireless communication function may be an entire device, or may be a chip or a processing system installed in the entire device. The device in which the chip or the processing system is installed may implement the method and the function in embodiments of this application under control of the chip or the processing system. For example, the STA may be user equipment that can connect to the Internet, for example, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone. Alternatively, the STA may be an Internet of things node in the Internet of things, an in-vehicle communication apparatus in the Internet of vehicles, an entertainment device, a game device or system, a global positioning system device, or the like. The STA may alternatively be a chip and a processing system in the foregoing terminals.

The WLAN system can provide high-speed and low-latency transmission. With continuous evolution of WLAN application scenarios, the WLAN system is to be applied to more scenarios or industries, for example, the Internet of things industry, the Internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the Internet of things, an entertainment terminal (for example, an AR, a VR, or another wearable device), a smart device in smart office (for example, a printer, a projector, a loudspeaker, or a stereo), an Internet of vehicles device in the Internet of vehicles, an infrastructure (for example, a vending machine, a self-service navigation station of a supermarket, a self-service cash register device, or a self-service ordering machine) in daily life scenarios, a device in a large sports and music venue, and the like. Specific forms of the STA and the AP are not limited in embodiments of this application, and are merely examples for description herein.

Figure 2A:
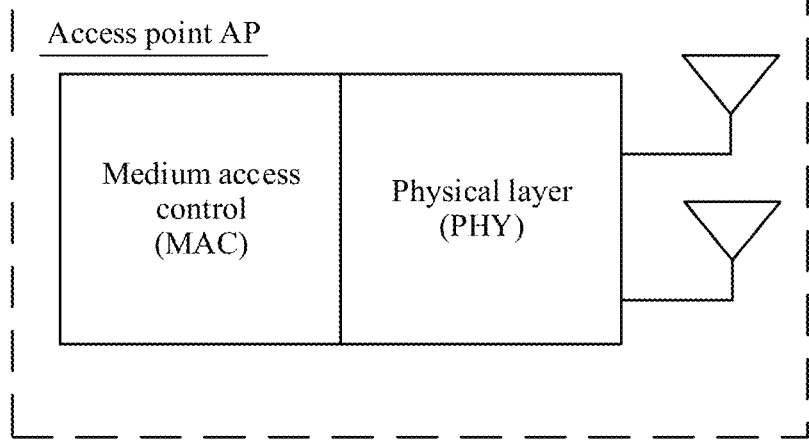
FIG. 2*a* is a schematic diagram of a structure of an access point according to an embodiment of this application.
Figure 2B:
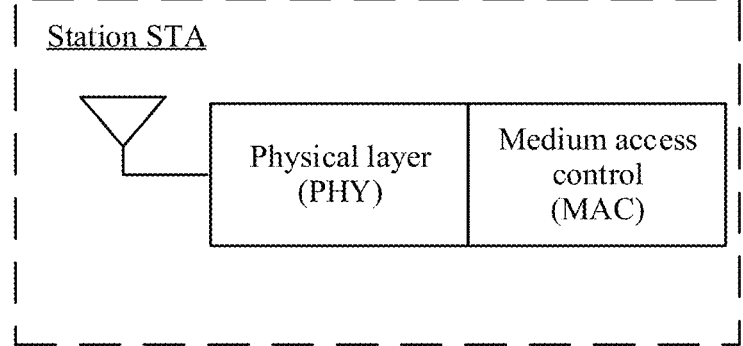
FIG. 2*b* is a schematic diagram of a structure of a station according to an embodiment of this application.

The 802.11 standard focuses on a physical layer (PHY) part and a medium access control (MAC) layer part. For example, FIG. 2a is a schematic diagram of a structure of an access point according to an embodiment of this application. The AP may be multi-antenna/multi-radio frequency, or may be single-antenna/single-radio frequency. The antenna/radio frequency is used to send/receive a data packet. In an implementation, an antenna or a radio frequency part of the AP may be separated, in other words, remotely separated from a main body of the AP. In FIG. 2a, the AP may include a physical layer processing circuit and a medium access control layer processing circuit. The physical layer processing circuit may be configured to process a physical layer signal, and the MAC layer processing circuit may be configured to process a MAC layer signal. For another example, FIG. 2b is a schematic diagram of a structure of a station according to an embodiment of this application. FIG. 2b is a schematic diagram of a structure of a single-antenna/single-radio frequency STA. In an actual scenario, the STA may also be multi-antenna/multi-radio frequency, and may be a device with more than two antennas. The antenna/radio frequency is used to send/receive a data packet. In an implementation, an antenna or a radio frequency part of the STA may be separated, in other words, remotely separated from a main body of the STA. In FIG. 2b, the STA may include a PHY processing circuit and a MAC processing circuit. The physical layer processing circuit may be configured to process a physical layer signal, and the MAC layer processing circuit may be configured to process a MAC layer signal.

802.11be supports a maximum of 16 spatial streams and 4096-order QAM is considered. Higher-order QAM modulation has a higher requirement on a signal to noise ratio. Therefore, how to support a higher-order modulation scheme in a case of a larger number of spatial streams in 802.11be to achieve a large number of spatial streams and a high modulation order becomes an urgent problem to be resolved.

In an implementation, output SNRs of some spatial streams in all spatial streams may be improved by using a beamforming technology. Specifically, a transmit end (that is, the beamformer) generates a corresponding beamforming steering matrix Q based on the channel state information that is of the transmit end and a receive end and that is obtained by the receive end (that is, the beamformee), and then multiplies Q by a vector output through constellation point mapping. The matrix Q may be a matrix Q generated based on the beamforming report fed back in a channel sounding process (the beamforming report includes a compressed beamforming feedback matrix V, and the matrix V is obtained after singular value decomposition is performed on the channel state information of the receive end and the transmit end). The matrix Q is used to adjust an amplitude and a phase of the vector output through constellation point mapping, so that an equivalent SNR of the receive end (that is, the beamformee) is higher, and channel selective fading can be effectively mitigated.

Although the output SNRs of some spatial streams in all spatial streams can be effectively improved through beamforming, signal to noise ratios of a small number of spatial streams deteriorate, and the signal to noise ratios of the small number of spatial streams become a bottleneck. In addition, a method for reducing a number of spatial streams is usually used to increase a QAM order (higher-order QAM modulation may support a higher data rate). For example, both the transmit end and the receive end have four antennas (in this case, a maximum of four spatial streams can be sent because a number of spatial streams supported by the transmit end is equal to a smaller value of a number of antennas at the transmit end and a number of antennas at the receive end), only three spatial streams may be sent, and data is not sent on a spatial stream with a worse SNR. As a result, the transmit end (that is, the beamformer) cannot use high-order QAM on all the spatial streams, and cannot achieve a large number of spatial streams and a high QAM order.

According to the power control method in a wireless local area network provided in this embodiment of this application. After a beamformee feeds back, in a beamforming report, a power control parameter of each spatial stream, or feeds back a parameter used to calculate a power control parameter, so that a beamformer obtains the power control parameter of each spatial stream, and then adjusts transmit power of each spatial stream when data is subsequently sent (or performs power control on subsequently sent data), to improve a signal to noise ratio of a spatial stream with an original worse SNR (which is a worse SNR in a channel sounding phase) when an SNR of a spatial stream with a good channel is not affected. In this way, a higher-order modulation scheme in a case of a larger number of spatial streams is supported, to achieve a large number of spatial streams and a high modulation order. This improves a system throughput.

Figure 3:
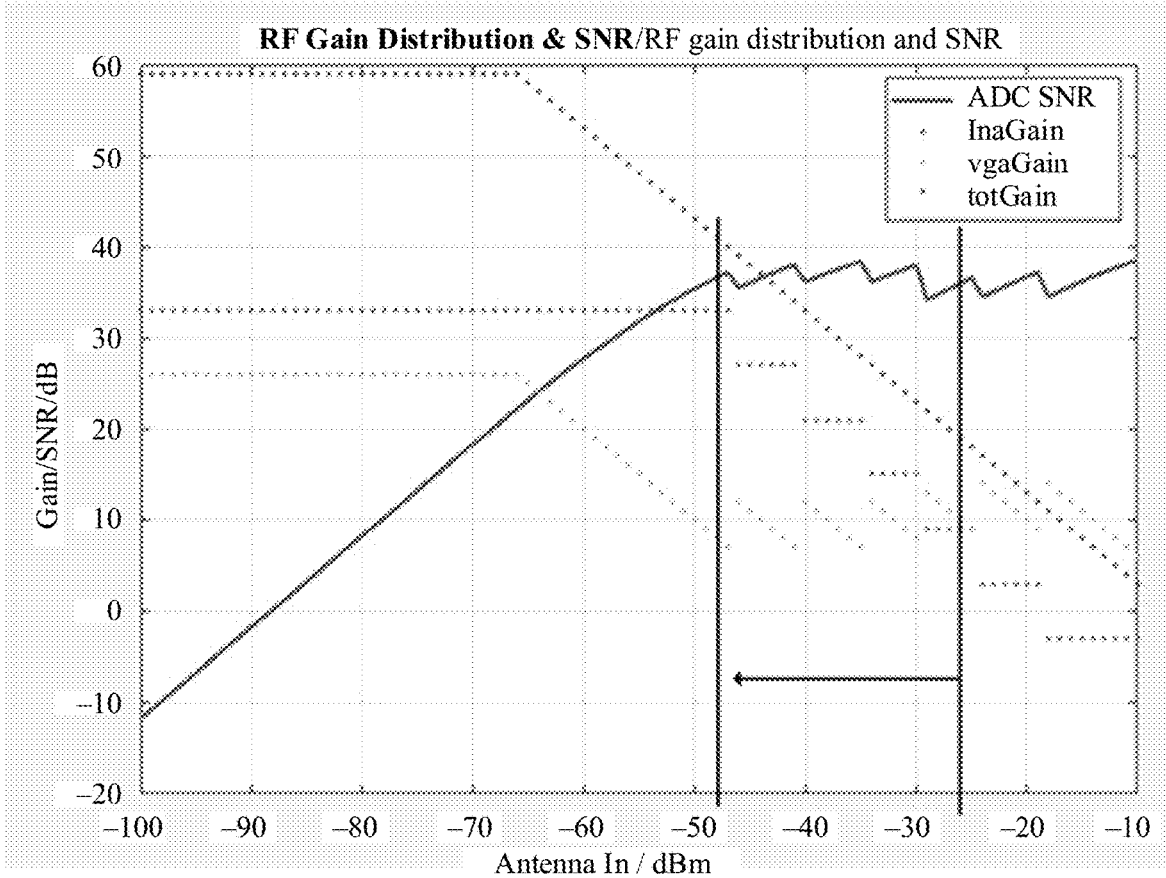
FIG. 3 is a schematic diagram of a relationship between an RSSI and an SNR of a receive antenna according to an embodiment of this application.

Before the technical solutions provided in this application are described, the following first describes a characteristic of a receive antenna of a beamformee—a low-noise amplifier (LNA) characteristic in this application. FIG. 3 is a schematic diagram of a relationship between an RSSI and an SNR of a receive antenna according to an embodiment of this application. In FIG. 3, a horizontal axis represents an RSSI on a receive antenna, and a vertical axis represents an SNR. It can be seen from FIG. 3 that, from left to right, on the left of a first vertical line (that is, before the RSSI corresponding to the first vertical line, the RSSI in FIG. 3 is approximately less than ~48 dB), the SNR and the RSSI have a linear relationship, and are positively related with each other to increase synchronously. However, on the right of the first vertical line, even if the RSSI of the receive antenna further increases, the SNR does not linearly increase, but presents a floor (floor). This indicates that on the right of the first vertical line (when the RSSI in FIG. 3 is approximately greater than −48 dB), increase of the RSSI cannot improve the SNR. That is, in this case, the increase of the RSSI does not improve performance of the receive antenna.

Therefore, based on the low-noise amplifier characteristic of the receive antenna, this application provides a power control method in a wireless local area network. For a receive antenna with a large RSSI, especially a receive antenna whose RSSI is greater than a value indicated by an intersection point of the first vertical line and the horizontal axis (the value indicated by the intersection point is referred to as an RSSI threshold of the receive antenna in this embodiment of this application, and is approximately −48 dB in FIG. 3), a beamformer may perform power control on a spatial stream based on feedback from the beamformee, to appropriately reduce the RSSI of the receive antenna of the beamformee(for example, a second vertical line moves to the first vertical line from left to right in FIG. 3, that is, the RSSI is approximately reduced from −34 dB to −48 dB). It should be understood that each receive antenna of the beamformee has its own RSSI threshold. To be specific, total transmit power is reduced as a whole when an SNR of a spatial stream with good channel quality is not affected. In this way, at a receive end (that is, the beamformee), power of all spatial streams can be centrally amplified by using a power amplifier, to improve an SNR of a spatial stream with poor channel quality.

The following describes in detail the technical solutions provided in this application with reference to more accompanying drawings.

The technical solutions provided in this application are described in detail by using two embodiments. Embodiment 1 describes: In a channel sounding process, the beamformee feeds back a power control parameter of each spatial stream, to help the beamformer adjust transmit power of each spatial stream. Embodiment 2 describes: In a channel sounding process, the beamformee feeds back received signal strength indicators (RSSIs) of some (or all) receive antennas of the beamformee and corresponding radio frequency parameters (for example, RSSI thresholds of different receive antennas). The beamformer calculates a power adjustment parameter of each spatial stream based on feedback of the beamformee, and adjusts transmit power of each spatial stream.

It may be understood that the beamformer in this application may be an AP, for example, any AP in FIG. 1, and the beamformee in this application may be a STA, for example, any STA in FIG. 1. The beamformer may support the IEEE 802.11be protocol (or referred to as Wi-Fi 7, EHT protocol), and may further support another WLAN communication protocol, for example, protocols, such as IEEE 802.11ax and IEEE 802.11ac. The beamformee may support the IEEE 802.11be protocol. It should be understood that the beamformer and the beamformee in this application may further support a next-generation protocol of IEEE 802.11be. In other words, the power control method in a wireless local area network provided in this application is not only applicable to the IEEE 802.11be protocol, but also applicable to the next-generation protocol of the IEEE 802.11be.

It should be further understood that in the channel sounding process, the beamformer may indicate to one or more beamformees to concurrently/simultaneously perform channel sounding. For ease of understanding, the following provides descriptions by using interaction/communication/channel sounding between one beamformee and the beamformer as an example. Operations of the other beamformees are the same as/similar to that of the beamformee, and details are not described herein again.

Embodiment 1

Embodiment 1 of this application mainly describes: In a channel sounding process, a beamformee feeds back a power control parameter of each spatial stream in a beamforming report (Beamforming report, BFR), to help a beamformer adjust transmit power of each spatial stream, to improve a signal to noise ratio of a spatial stream with an original worse SNR (which is a worse SNR in a channel sounding phase) when an SNR of a spatial stream with good channel quality is not affected.

Figure 4:
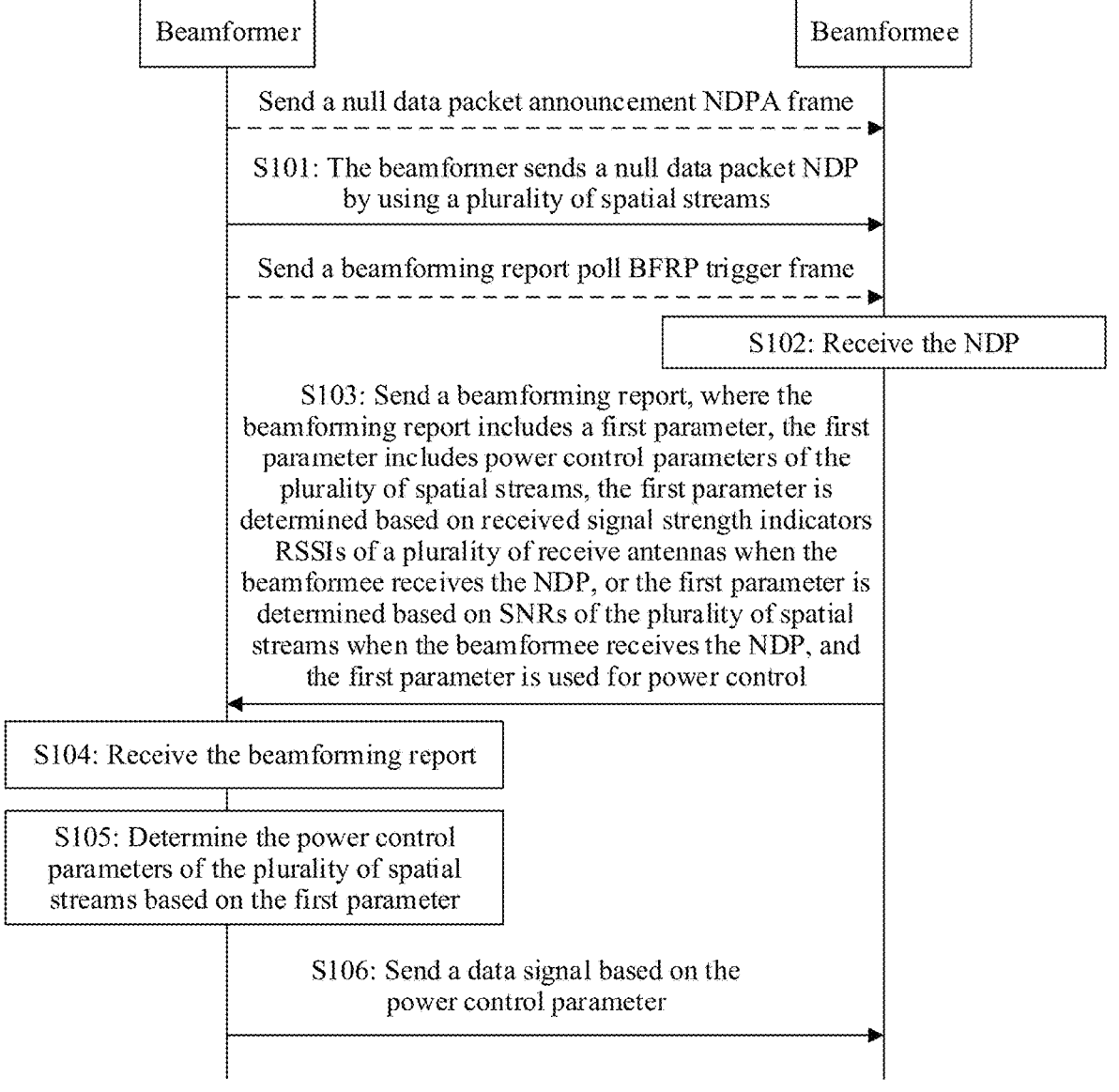
FIG. 4 is a schematic flowchart of a power control method in a wireless local area network according to an embodiment of this application.

FIG. 4 is a schematic flowchart of a power control method in a wireless local area network according to an embodiment of this application. As shown in FIG. 4, the power control method in a wireless local area network includes but is not limited to the following steps.

S101: The beamformer sends a null data packet (NDP) by using a plurality of spatial streams.

S102: The beamformee receives the NDP.

Specifically, the beamformer sends a null data packet announcement (NDPA) frame to notify one or more beamformees (or stations) requiring channel sounding and related channel sounding parameters. Then, after a period of time (for example, a short inter-frame space (short inter-frame space, SIFS)), the beamformer sends the NDP (by using the plurality of spatial streams. The NDP is used by the beamformee to perform channel estimation, to obtain channel state information. Correspondingly, the beamformee receives the NDPA frame and the NDP. The NDP in this application refers to a data packet that has no data field part and does not carry a medium access control (MAC) frame.

Optionally, a signal field of the NDP may carry indication information, to indicate whether a first parameter needs to be fed back. The first parameter herein may be power control parameters of the plurality of spatial streams. If the indication information indicates to feed back the first parameter, the beamformee may carry the first parameter in the beamforming report that is fed back. If the indication information does not indicate to feed back the first parameter, the beamformee performs common channel sounding, and feeds back a common beamforming report, that is, the beamforming report does not carry the first parameter.

Optionally, the NDPA frame may further include indication information. The indication information indicates whether the beamformee needs to feed back the first parameter. For example, the indication information may be carried in a user information field in which an association identifier (AID) of the NDPA frame is a reserved value (for example, 2044). Alternatively, a reserved bit of the user information field of the NDPA frame is used to indicate whether the beamformee needs to feed back the first parameter. The first parameter herein may be the power control parameters of the plurality of spatial streams. If the indication information indicates to feed back the first parameter, the beamformee may carry the first parameter in the beamforming report that is fed back. If the indication information does not indicate to feed back the first parameter, the beamformee performs common channel sounding, and feeds back a common beamforming report, that is, the beamforming report does not carry the first parameter.

It may be understood that the indication information may be carried in the NDPA frame, or may be carried in the NDP, or may be carried in both the NDPA frame and the NDP. When the indication information is carried in both the NDPA frame and the NDP, content indicated by the indication information in the NDP should be consistent with content indicated by the indication information in the NDPA frame. In other words, the indication information in the NDPA frame and the NDP indicates to feed back the first parameter, or does not indicate to feed back the first parameter.

It should be further understood that the signal field of the NDP and the NDPA frame may not carry the indication information, but it is directly agreed in a protocol that the beamformee feeds back the first parameter in the channel sounding process. Specifically, the first parameter may be fed back in the beamforming report, or may be independently fed back.

S103: The beamformee sends the beamforming report. The beamforming report includes the first parameter. The first parameter includes the power control parameters of the plurality of spatial streams. The first parameter is determined based on received signal strength indicators (RSSIs) of a plurality of receive antennas when the beamformee receives the NDP. Alternatively, the first parameter is determined based on SNRs of the plurality of spatial streams when the beamformee receives the NDP. The first parameter is used for power control.

S104: The beamformer receives the beamforming report.

Optionally, the beamforming report (BFR) is an action frame (Action No ACK frame) that does not need to be acknowledged. The beamforming report includes a multiple-input multiple-output (MIMO) control field indicating parameters of the beamforming report. In addition, the beamforming report further includes one or more fields such as a compressed beamforming report, a multi-user-specific beamforming report, and a channel quality information report. The compressed beamforming report includes an average SNR of each spatial stream, and a compressed beamforming feedback matrix V based on every Ng (Number of grouping, a number of groups, where Ng=4 or 16) subcarriers of each spatial stream. The multi-user-specific beamforming report includes a difference between the average SNR and an SNR based on every Ng subcarriers of each spatial stream.

Optionally, the beamforming report further includes the first parameter, and the first parameter includes the power control parameters of the plurality of spatial streams. It should be understood that a number of spatial streams herein may be less than or equal to a number of spatial streams used when the beamformer sends the NDP. The power control parameters of the plurality of spatial streams are generated based on a first received signal strength indicator (Received Signal Strength Indicator, RSSI), a first RSSI threshold, and a first antenna index. The first RSSI is a largest RSSI of the plurality of receive antennas when the beamformee receives the NDP, the first antenna index is an index of a receive antenna corresponding to the first RSSI, and the first RSSI threshold is an RSSI threshold of the receive antenna corresponding to the first RSSI. The first RSSI threshold may be determined based on a low-noise amplifier (low noise amplifier, LNA) characteristic of the receive antenna. The power control parameters of the plurality of spatial streams are used for power control or used to adjust transmit power of each spatial stream when a data signal is subsequently sent.

Alternatively, the power control parameters of the plurality of spatial streams may be determined based on the SNRs of the plurality of spatial streams when the beamformee receives the NDP. Specifically, a power control parameter of an $i^{th}$ spatial stream in the plurality of spatial streams is determined based on a signal to noise ratio (SNR) of the $i^{th}$ spatial stream when the beamformee receives the NDP, a smallest SNR in the SNRs of the plurality of spatial streams when the beamformee receives the NDP, and a preset value (or a fixed value). The $i^{th}$ spatial stream may be any one of the plurality of spatial streams. A value of i may fall within a closed range $[1, N]$. N is the number of spatial streams used when the beamformer sends the NDP. The preset value (or the fixed value) may be a constant value selected based on implementation, for example, 5 dB.

Optionally, the first parameter may be independently included in the beamforming report. Alternatively, the first parameter is included in one or more fields such as the MIMO control field, the compressed beamforming report, the multi-user-specific beamforming report, and the channel quality information report.

Optionally, after the step S101, the beamformer may further send a beamforming report poll (BFRP) trigger frame. The BFRP trigger frame is used to trigger the beamformee (for example, the station) to feed back the beamforming report. There may be two modes classified based on whether the beamformer sends the BFRP trigger frame after the NDP. For example, a mode 1 or a mode 2 is distinguished based on a number of beamformees. The technical solution provided in this embodiment of this application may be the mode 1 or the mode 2.

Figure 5A:
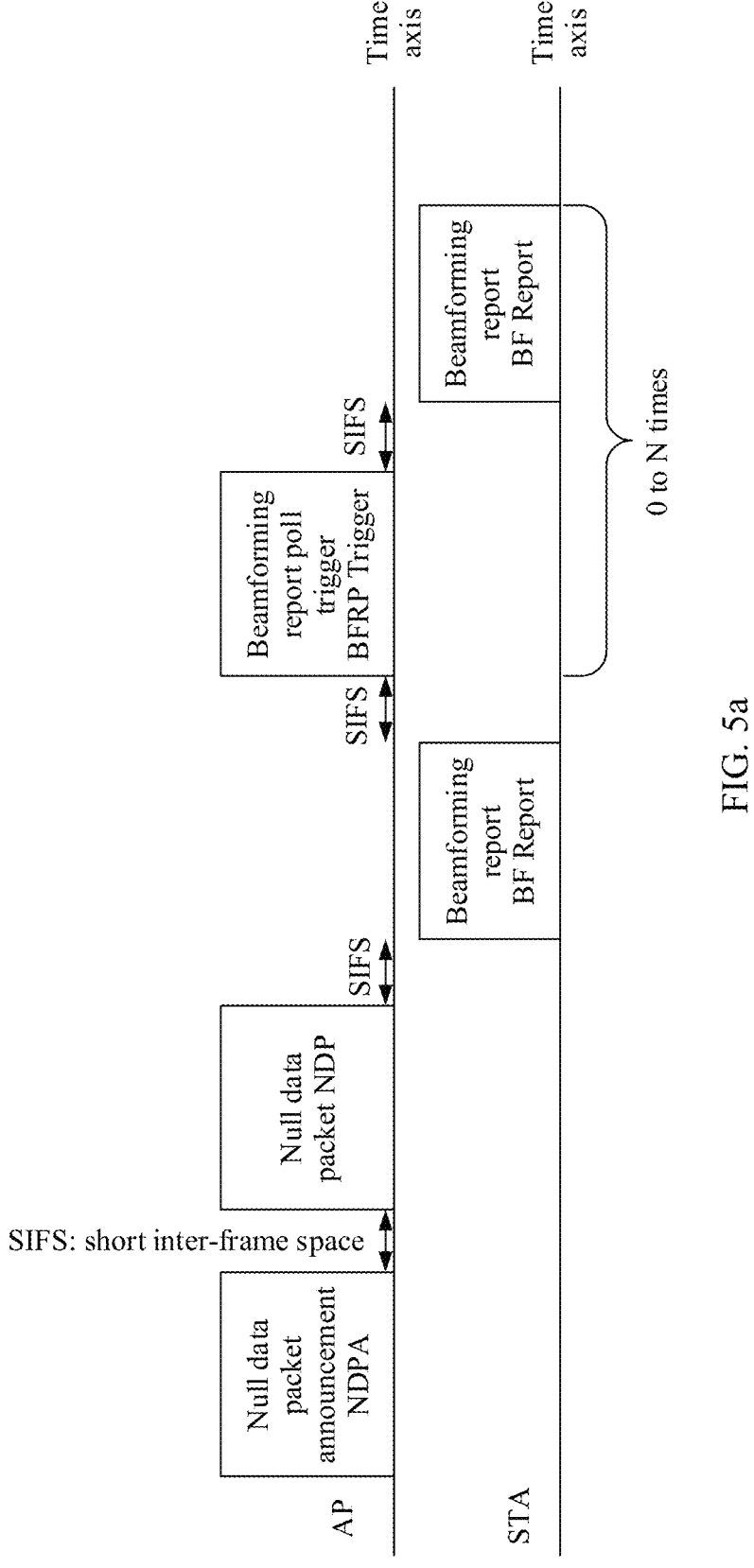
FIG. 5*a* is a schematic diagram of a time sequence of single-user channel state information feedback according to an embodiment of this application.

In an example, in a case of a single beamformee, because the beamformee needs to additionally calculate a power control parameter of each spatial stream, and requires a longer processing delay, a BFRP trigger frame may also need to be sent after the NDP. For example, the beamformer is an AP, and the beamformee is a STA. FIG. 5a is a schematic diagram of a time sequence of single-user channel state information feedback according to an embodiment of this application. As shown in FIG. 5a, the AP sends an NDPA frame, and sends an NDP after one SIFS. After receiving the NDP, the STA performs channel estimation, and sends a beamforming report (BF report) after one SIFS. The beamforming report includes channel state information. After receiving the beamforming report, the AP sends a BFRP trigger frame after one SIFS. After receiving the BFRP trigger frame, the STA sends a new beamforming report after one SIFS. The new beamforming report includes the first parameter.

Figure 5B:
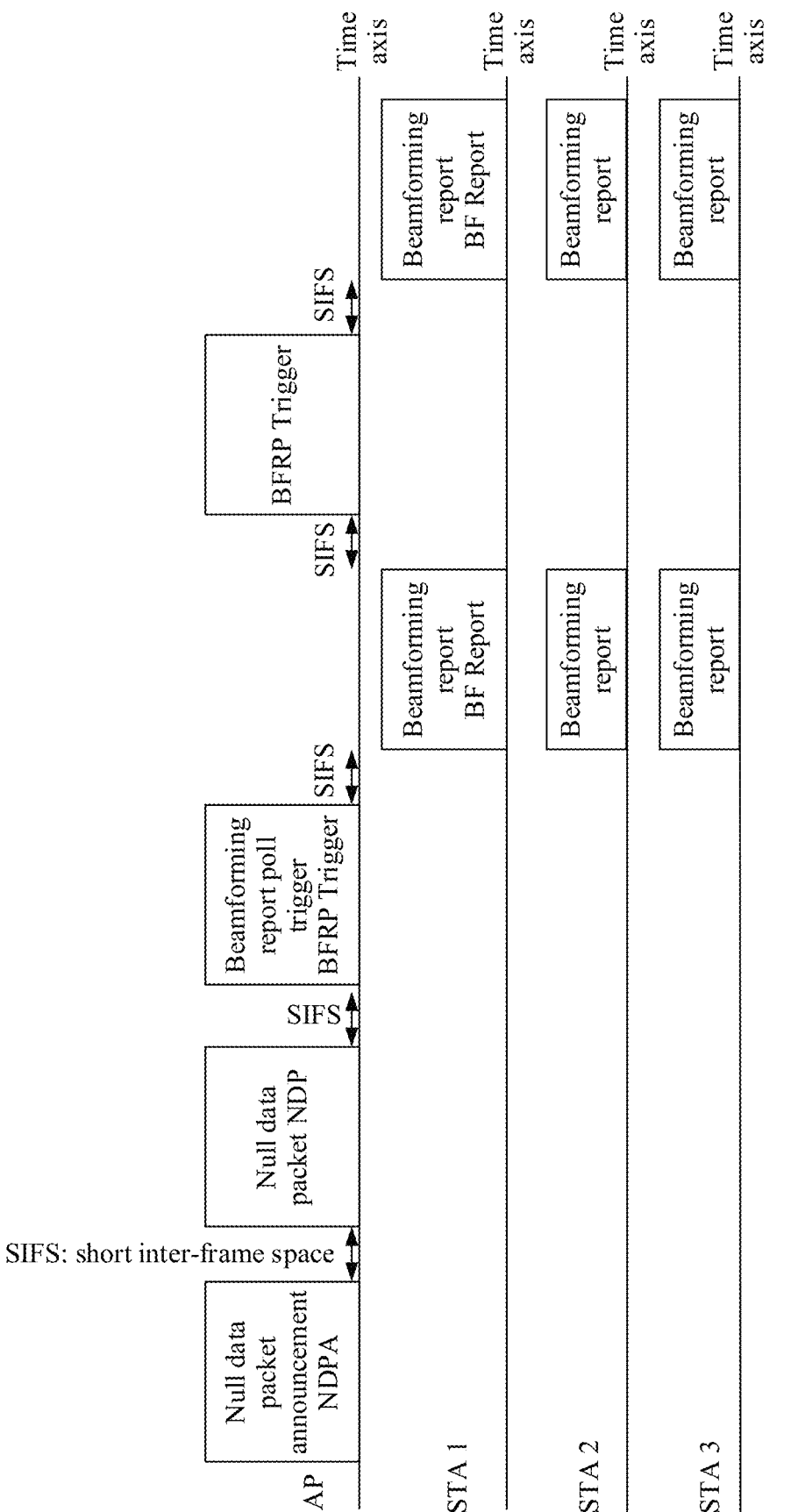
FIG. 5*b* is a schematic diagram of a time sequence of multi-user channel state information feedback according to an embodiment of this application.

In another example, in a case of a plurality of beam-formees, to improve transmission efficiency, a BFRP trigger frame may be used to trigger the plurality of beamformees to simultaneously or concurrently feed back beamforming reports. For example, the beamformer is an AP, and the beamformee is a STA. FIG. 5b is a schematic diagram of a time sequence of multi-user channel state information feed-back according to an embodiment of this application. As shown in FIG. 5b, the AP sends an NDPA frame, and sends an NDP after one SIFS. After sending the NDP, the AP sends the BFRP trigger frame after one SIFS. A STA 1, a STA 2, and a STA 3 separately receive the BFRP trigger frame, and simultaneously or concurrently feed back beamforming reports of the STA 1, the STA 2, and the STA 3. Each beamforming report includes a first parameter. In other words, the beamforming report fed back by the STA 1 includes a first parameter obtained by the STA 1, the beamforming report fed back by the STA 2 includes a first parameter obtained by the STA 2, and the beamforming report fed back by the STA 3 includes a first parameter obtained by the STA 3.

Specifically, for the foregoing step S103, before sending the beamforming report, the beamformee first needs to obtain the first parameter. The following describes in detail two implementations in which the beamformee obtains the first parameter. The first implementation describes how the beamformee calculates the first parameter based on the RSSIs of the plurality of receive antennas. The second implementation describes how the beamformee calculates the first parameter based on the SNRs of the plurality of spatial streams.

In the first implementation, when receiving the NDP, the beamformee measures (or obtains) an RSSI of each receive antenna (the obtained RSSI herein is an RSSI when all spatial streams are mixed for receiving). Then, the beam-formee determines the largest RSSI from the RSSIs of the plurality of receive antennas. The largest RSSI is denoted as the first RSSI (or $RSSI_j$, where j is an index of a receive antenna with the largest RSSI measured when the beam-formee receives the NDP). The index of the receive antenna corresponding to the first RSSI is denoted as the first antenna index (or j). The beamformee obtains the first RSSI thresh-old (denoted as $RSSIX_j$) corresponding to the first antenna index. The first RSSI threshold is determined based on the low-noise amplifier (LNA) characteristic of the receive antenna. It should be understood that one receive antenna corresponds to one RSSI threshold. If the first RSSI is greater than the first RSSI threshold, the beamformee cal-culates the power control parameter of each of the plurality of spatial streams based on the first antenna index (that is, j) and a difference (that is, $RSSI_j$–$RSSIX_j$) between the first RSSI and the first RSSI threshold.

In an example, a method for calculating a power control parameter of a subcarrier is used as an example. Specifically, a power control parameter of a kth subcarrier is shown in the following formula (1-1):

$$PC_i = f(RSSI_j - RSSIX_j) \qquad (1\text{-}1)$$

In the formula (1-1), $PC_i$ indicates the power control parameter of the $i^{th}$ spatial stream, a value of i falls within a closed range [1, N], and N is a number of spatial streams used when the beamformer sends the NDP. f( ) indicates a mapping function from a $j^{th}$ receive antenna to a spatial stream. $RSSI_j$ indicates an RSSI of the $j^{th}$ receive antenna. $RSSIX_j$ indicates an RSSI threshold of the $j^{th}$ receive antenna. j is an index of a receive antenna with the largest RSSI when the beamformee receives the NDP.

In other words, because the value of i ranges from 1 to N, the foregoing formula (1-1) may be further described as $\{PC_1, PC_2, PC_3, \ldots, PC_N\} = f(RSSI_j - RSSIX_j)$. That is, the foregoing formula (1-1) represents one input (that is, $RSSI_j$–$RSSIX_j$) and N outputs (that is, $PC_1, PC_2, PC_3, \ldots, PC_N$). Because the $RSSI_j$ herein is an RSSI measured when all spatial streams are mixed for receiving, all the spatial streams may be mapped based on the RSSI of the $j^{th}$ receive antenna.

Optionally, f( ) in the foregoing formula (1-1) may be determined based on channel state information of the $j^{th}$ receive antenna, and the channel state information may also be determined based on a long training sequence in the NDP. Specifically, the beamformee may obtain the channel state information of the $j^{th}$ receive antenna based on the long training sequence in the NDP, to calculate f( ). f( ) is a value of a $j^{th}$ row of a matrix product $(H_{N_{RX}*N_{TX}} \cdot Q_{N_{TX}*N_{SS}})$ of a beamforming steering matrix $Q_{N_{TX}*N_{SS}}$ and a channel matrix $H_{N_{RX}*N_{TX}}$ at transmit and receive ends.

If beamforming is not used when the NDP is sent, and the number of spatial streams is the same as a number of antennas, the beamforming steering matrix $Q_{N_{TX}*N_{SS}}$ is an orthogonal P matrix. In addition, a sent signal $x_{N_{SS}}$ and a received signal vector $y_{N_{RX}}$ in a long training sequence field are known values, and noise $z_{N_{RX}}$ is also known. Therefore, the channel matrix $H_{N_{RX}*N_{TX}}$ at the transmit and receive ends may be calculated according to the following formula (1-2):

$$y_{N_{RX}} = \sqrt{\frac{1}{N_{TX}}} \cdot H_{N_{RX}*N_{TX}} \cdot Q_{N_{TX}*N_{SS}} \cdot x_{N_{SS}} + z_{N_{RX}} \qquad (1\text{-}2)$$

In the formula (1-2), $N_{TX}$ indicates a number of transmit antennas, that is, a number of antennas of the beamformer. $N_{RX}$ indicates a number of receive antennas, that is, a number of antennas of the beamformee. $N_{SS}$ indicates the number of spatial streams used when the beamformer sends the NDP.

In the foregoing example, the receive antenna with the largest RSSI is used as an example. The method for calcu-lating the power control parameter may be further extended to receive antennas with first M largest RSSIs.

In another example, the receive antenna with the largest RSSI and a receive antenna with a second largest RSSI are used as an example, a power control parameter on a kth subcarrier may also be shown in the following formula (1-3):

$$PC_i = f(RSSI_j - RSSIX_j, RSSI_m - RSSIX_m) \qquad (1\text{-}3)$$

In the formula (1-3), $PC_i$ indicates the power control parameter of the $i^{th}$ spatial stream, a value of i falls within a closed range [1, N], and N is a number of spatial streams used when the beamformer sends the NDP. f( ) indicates a mapping function from a $j^{th}$ receive antenna and an $m^{th}$ receive antenna to a spatial stream. $RSSI_j$ indicates an RSSI of the $j^{th}$ receive antenna. $RSSIX_j$ indicates an RSSI thresh-old of the $j^{th}$ receive antenna. j is an index of a receive antenna with the largest RSSI when the beamformee receives the NDP. $RSSI_m$ indicates an RSSI of the $m^{th}$ receive antenna. $RSSIX_m$ indicates an RSSI threshold of the $m^{th}$ receive antenna. m is an index of the receive antenna with the second largest RSSI when the beamformee receives the NDP. j is not equal to m. It should be understood that the "second largest" herein is less than only the largest, that is, the second in descending order of RSSIs. It should be further understood that the foregoing formula (1-3) may be further extended to first three receive antennas, first four receive antennas, and first M receive antennas that are sorted in descending order of RSSIs. A value of M is less than N.

In other words, the foregoing formula (1-3) may also be described as $\{PC_1, PC_2, PC_3, \ldots, PC_N\} = f(RSSI_j - RSSIX_j, RSSI_m - RSSIX_m)$. That is, the foregoing formula (1-3) represents two inputs (that is, $RSSI_j - RSSIX_j$ and $RSSI_m - RSSIX_m$), but still has only N outputs (that is, $PC_1, PC_2, PC_3, \ldots, PC_N$).

Optionally, f( ) in the foregoing formula (1-3) may be determined based on channel state information of the $j^{th}$ receive antenna and the $m^{th}$ receive antenna, and the channel state information may also be determined based on a long training sequence in the NDP. Specifically, the beamformee may obtain the channel state information of the $j^{th}$ receive antenna and the $m^{th}$ receive antenna based on the long training sequence in the NDP, to calculate f( ). f( ) is values of a $j^{th}$ row and an $m^{th}$ row of a matrix product $(H_{N_{RX}*N_{TX}} \cdot Q_{N_{TX}*N_{SS}})$ of a beamforming steering matrix $Q_{N_{TX}*N_{SS}}$ and a channel matrix $H_{N_{RX}*N_{TX}}$ at transmit and receive ends.

Optionally, the foregoing two examples schematically illustrate a method for calculating a power control parameter of a single subcarrier. The beamformee may obtain the power control parameter of each subcarrier, and may feed back an average value of power control parameters of each spatial stream for an entire bandwidth, or may feed back the power control parameters of each spatial stream based on a sub-bandwidth (for example, in a unit of 10 MHz, 5 MHz, or 20 MHz). For example, an entire bandwidth of 20 MHz is used as an example. 256 subcarriers (subcarrier indexes range from −128 to 127, that is, −128, . . . , −1, 0, 1, . . . , 127) are included in total, and four subcarriers or 16 subcarriers are usually used as a group for feedback. When Ng (a number of groups) is 4 (four subcarriers form a group), indexes of subcarriers that need to be fed back are [−122, −120:4:−4, −2, 2, 4:4:120, 122], and there are 64 subcarriers in total. If the number of spatial streams used when the beamformer sends the NDP is 4, an average value of power control parameters (there are 64 power control parameter values on the 64 subcarriers for a first spatial stream) of the 64 subcarriers (subcarrier indexes are respectively [−122, −120:4:−4, −2, 2, 4:4:120, 122]) may be fed back for the first spatial stream. That is avg $$(PC_1^1, PC_1^2, PC_1^3, \ldots, PC_1^q, \ldots, PC_1^{64}),$$

where avg( ) indicates an average value function, $$PC_1^1$$

indicates a power control parameter of the first spatial stream on a first subcarrier in the 64 subcarriers, $$PC_1^2$$

indicates a power control parameter of the first spatial stream on a second subcarrier in the 64 subcarriers, $$PC_1^q$$

indicates a power control parameter of the first spatial stream on a $q^{th}$ subcarrier in the 64 subcarriers, and a value of q is an integer in a range [1, 64]. Similarly, an average value of power control parameters of 64 subcarriers (there are 64 power control parameter values on the 64 subcarriers for a second spatial stream) is fed back for the second spatial stream, that is, avg $$(PC_2^1, PC_2^2, PC_2^3, \ldots, PC_2^q, \ldots, PC_2^{64}).$$

An average value of power control parameters of 64 subcarriers (there are 64 power control parameter values on the 64 subcarriers for a third spatial stream) is fed back for the third spatial stream, that is, avg $$(PC_3^1, PC_3^2, PC_3^3, \ldots, PC_3^q, \ldots, PC_3^{64}).$$

An average value of power control parameters of 64 subcarriers (there are 64 power control parameter values on the 64 subcarriers for a fourth spatial stream) is fed back for the fourth spatial stream, that is, avg $$(PC_4^1, PC_4^2, PC_4^3, \ldots, PC_4^q, \ldots, PC_4^{64}).$$

For another example, an entire bandwidth of 20 MHz is used as an example. The power control parameter of each spatial stream is fed back at a granularity of a 10 MHz bandwidth. In this case, an average value of power control parameters of first 32 subcarriers and an average value of power control parameters of last 32 subcarriers may be fed back for each spatial stream.

Optionally, when the power control parameter of each spatial stream is calculated, combination with another factor may be further considered. For example, an SNR of the first spatial stream when the beamformee receives the subsequent data signal needs to be greater than or equal to an SNR of the second spatial stream when the beamformee receives the subsequent data signal. Alternatively, the SNR of the first spatial stream when the beamformee receives the subsequent data signal needs to be greater than or equal to a sum of the preset value (or the fixed value) and the SNR of the second spatial stream when the beamformee receives the subsequent data signal. The first spatial stream is a spatial stream with a largest SNR of the plurality of spatial streams when the beamformee receives the NDP, and the second spatial stream is a spatial stream with a smallest SNR of the plurality of spatial streams when the beamformee receives the NDP. The preset value or the fixed value may be 5 dB. In other words, after the SNR of the spatial stream with the largest SNR before adjustment and the SNR of the spatial stream with the smallest SNR before adjustment are adjusted, the former cannot be less than the latter, and further, the former cannot be less than the latter plus the fixed value, for example, 5 dB, to ensure that, after adjustment, a spatial stream with an original better SNR is still better than a spatial stream with an original worse SNR and is greater than or equal to 5 dB.

In a second implementation, when receiving the NDP, the beamformee obtains an SNR of each of the plurality of spatial streams. The beamformee calculates the power control parameter of the $i^{th}$ spatial stream in the plurality of spatial streams based on the SNR of the $i^{th}$ spatial stream when the beamformee receives the NDP, the smallest SNR in the SNRs of the plurality of spatial stream when the beamformee receives the NDP, and the preset value (or the fixed value). The preset value (or the fixed value) is a constant value selected based on implementation experience, for example, 5 dB.

In an example, the power control parameter of the $i^{th}$ spatial stream meets the following condition:

$$SNR_i - PC_i \leq SNR_{min} + \text{preset value} \qquad (1\text{-}4)$$

$SNR_i$ indicates an SNR of the $i^{th}$ spatial stream when the beamformee receives the NDP, and $PC_i$ indicates the power control parameter of the $i^{th}$ spatial stream. $SNR_{min}$ indicates the smallest SNR in the SNRs of the plurality of spatial streams when the beamformee receives the NDP. It should be understood that in the inequality (1-4), $PC_i$ is unknown, and other items are known.

Optionally, i may be an index of a spatial stream with a largest SNR when the beamformee receives the NDP. In other words, in this case, power control is performed only on the spatial stream with the largest SNR (that is, only a power control parameter of the spatial stream with the largest SNR is calculated). Alternatively, values of i are indexes of spatial streams with first M largest SNRs when the beamformee receives the NDP. For example, four spatial streams are used when the NDP is sent, and M is equal to 2. It is assumed that an SNR of a first spatial stream is the largest, and an SNR of a third spatial stream is the second largest. In this case, values of i are 1 and 3. In other words, in this case, power control is performed on all spatial streams with the first M largest SNRs (that is, power control parameters of the spatial streams with the first M largest SNRs, for example, a power control parameter of the first spatial stream and a power control parameter of the third spatial stream need to be calculated). Alternatively, the value of i falls within the range [1, N]. N is the number of spatial streams used when the beamformer sends the NDP. In other words, in this case, power control is performed on all spatial streams (that is, the power control parameter of each spatial stream needs to be calculated). It should be understood that M is less than N.

Optionally, after determining one PC, according to the foregoing inequality (1-4), the beamformee may further obtain a mapping relationship between a receive antenna and a spatial stream (that is, a mapping function f( ) from the receive antenna to the spatial stream) based on the channel state information, and then calculate, according to the foregoing formula (1-1) or the foregoing formula (1-3), a largest RSSI (that is, $RSSI_j$) or first n RSSIs (for example, $RSSI_j$ and $RSSI_m$) corresponding to the determined $PC_i$. It should be understood that, in this case, all items other than $RSSIX_j$ or $RSSIX_m$ in the formula (1-1) or the formula (1-3) are known. If $RSSI_j$ calculated based on $PC_i$ is less than $RSSIX_j$, the beamformee reduces the current $PC_i$, but decreased $PC_i$ needs to satisfy the inequality (1-4), to ensure that $RSSI_j$ calculated based on $PC_i$ is not less than $RSSIX_j$. $PC_i$ is finally obtained. It should be understood that the finally obtained $PC_i$ needs to meet two conditions: The foregoing inequality (1-4) is met, and $RSSI_j$ calculated based on $PC_i$ is not less than $RSSIX_j$.

Optionally, after the step S104, the power control method in a wireless local area network further includes the following steps.

S105: The beamformer determines the power control parameters of the plurality of spatial streams based on the first parameter.

S106: The beamformer sends the data signal based on the power control parameter. Correspondingly, the beamformee receives the data signal sent by the beamformer based on the power control parameter.

Specifically, the first parameter includes the power control parameters of the plurality of spatial streams. After receiving the beamforming report, the beamformer parses the first parameter in the beamforming report to obtain the power control parameters of the plurality of spatial streams. The beamformer sends the data signal based on the power control parameter. In other words, the beamformer sends the data signal by using the plurality of spatial streams. The transmit power of each of the plurality of spatial streams is adjusted based on the power control parameter. Correspondingly, the beamformee receives the data signal sent by the beamformer based on the power control parameter. A largest RSSI of the plurality of receive antennas when the beamformee receives the data signal is less than or equal to a second RSSI threshold. The second RSSI threshold is an RSSI threshold of a receive antenna with the largest RSSI in the plurality of receive antennas when the beamformee receives the data signal. The second RSSI threshold is determined based on a low-noise amplifier characteristic of the receive antenna with the largest RSSI in the plurality of receive antennas when the beamformee receives the data signal. In other words, if the receive antenna with the largest RSSI when the beamformee receives the data signal is the same as the receive antenna with the largest RSSI when the beamformee receives the NDP, an RSSI of a receive antenna identified by the first receive antenna index when the beamformee receives the data signal is less than or equal to the first RSSI threshold.

Optionally, the beamformer sending the data signal based on the power control parameter may be represented by the following formula (1-5):

$$y_{N_{RX}} = \sqrt{\frac{1}{N_{TX}}} \cdot H_{N_{RX}*N_{TX}} \cdot Q_{N_{TX}*N_{SS}} \cdot PC_{N_{SS}*N_{SS}} \cdot x_{N_{SS}} + z_{N_{RX}} \qquad (1\text{-}5)$$

$y_{N_{Rx}}$ indicates a received signal matrix with $N_{RX}$ rows and 1 column (or a received signal vector indicating the $N_{RX}$ rows, where the vector is a row vector), and each row corresponds to a received signal of one receive antenna. $N_{RX}$ indicates the number of receive antennas, that is, the number of antennas of the beamformee. $N_{TX}$ indicates the number of transmit antennas, that is, the number of antennas of the beamformer. $N_{SS}$ indicates the number of spatial streams used when the beamformer sends the NDP. $H_{N_{RX}*N_{TX}}$ is the channel matrix with $N_{RX}$ rows and $N_{TX}$ columns at the transmit end and the receive end, and $Q_{N_{TX}*N_{SS}}$ is the beamforming steering matrix with $N_{TX}$ rows and $N_{SS}$ columns. $PC_{N_{SS}*N_{SS}}$ is a power control matrix of a spatial stream with $N_{SS}$ rows and $N_{SS}$ columns. The power control matrix may be a diagonal matrix. Power control is performed on each spatial stream. $x_{N_{SS}}$ is sent signals of $N_{SS}$ spatial streams, and $z_{N_{RX}}$ is a noise signal. It should be understood that the power control matrix $PC_{N_{SS}*N_{SS}}$ of the spatial stream includes the power control parameters of the plurality of spatial streams.

In other words, the beamformer multiplies a to-be-sent signal (which refers to $$\sqrt{\frac{1}{N_{TX}}} \cdot H_{N_{RX}*N_{TX}} \cdot Q_{N_{TX}*N_{SS}} \cdot x_{N_{SS}}$$

in the formula (1-5)) by the power control matrix ($PC_{N_{SS}*N_{SS}}$) of the spatial stream to adjust the transmit power of each spatial stream, thereby reducing an RSSI of a receive antenna of the beamformee.

Optionally, the beamforming steering matrix (that is, a matrix Q) in the foregoing formula (1-5) is generated based on a matrix V obtained after singular value decomposition (Singular value decomposition, SVD) is performed on the channel state information. SVD decomposition is shown in the following formula (1-6):

$$H_{N_{RX}*N_{TX}}=U_{N_{RX}*N_{RX}} \cdot S_{N_{RX}*N_{TX}} \cdot V_{N_{TX}*N_{TX}}^{*} \qquad (1\text{-}6)$$

$V_{N_{TX}*N_{TX}}^{*}$ indicates conjugate transpose of a matrix $V_{N_{TX}*N_{TX}}$. In other words, the beamformer further performs power control based on the matrix Q (or the matrix V), that is, multiplies the power control matrix $PC_{N_{SS}*N_{SS}}$ of the spatial stream. Alternatively, a product of the matrix Q and the power control matrix $PC_{N_{SS}*N_{SS}}^{*}$ of the spatial stream is considered as a precoding matrix Q'. During precoding, the precoding matrix Q' is directly multiplied by the beamformer. $Q'_{N_{TX}*N_{SS}}=Q_{N_{TX}*N_{SS}} \cdot PC_{N_{SS}*N_{SS}}$.

It can be learned that the beamformee in this embodiment of this application feeds back the power control parameter of each spatial stream in the beamforming report, and the beamformer adjusts the transmit power of each spatial stream based on feedback, to indirectly reduce the RSSI on the receive antenna of the beamformee, and to reduce total transmit power as a whole when the SNR of the spatial stream with good channel quality is not affected. At the receive end (that is, the beamformee), power of all spatial streams may be centrally amplified by using a power amplifier, to improve an SNR of a spatial stream with an original worse SNR (that is, a bottleneck spatial stream). In this way, a higher-order modulation scheme in a case of a larger number of spatial streams is implemented, to achieve a large number of spatial streams and a high modulation order. This improves a system throughput.

Embodiment 2

Embodiment 2 of this application mainly describes: In a channel sounding process, a beamformee feeds back an RSSI of a receive antenna, a receive antenna index, and an RSSI threshold, so that a beamformer calculates a power adjustment parameter of each spatial stream based on feedback of the beamformee, and adjusts transmit power of each spatial stream, to improve a signal to noise ratio of a spatial stream with an original worse SNR (which is a worse SNR in a channel sounding phase) when an SNR of a spatial stream with good channel quality is not affected.

It should be understood that Embodiment 2 of this application is similar to Embodiment 1, and a difference lies in that content fed back in Embodiment 2 of this application is different from that fed back in Embodiment 1, and calculation of a power control parameter of a spatial stream is switched from the beamformee (a receive end) to the beamformer (a transmit end).

Figure 6:
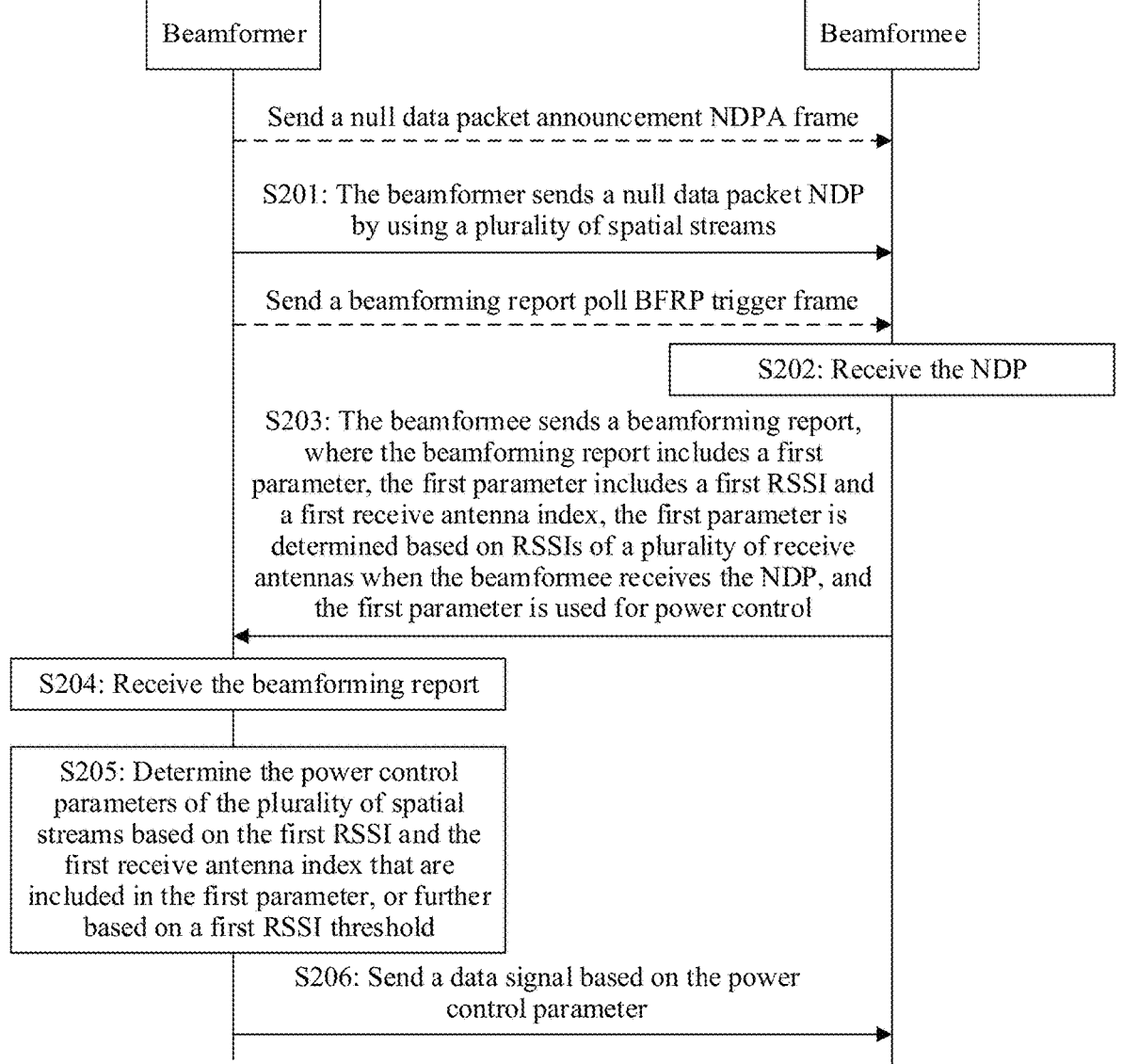
FIG. 6 is another schematic flowchart of a power control method in a wireless local area network according to an embodiment of this application.

FIG. 6 is a schematic flowchart of a power control method in a wireless local area network according to an embodiment of this application. As shown in FIG. 6, the power control method in a wireless local area network includes but is not limited to the following steps.

S201: The beamformer sends a null data packet NDP by using a plurality of spatial streams.

S202: The beamformee receives the NDP.

Specifically, for implementations of the step S201 and the step S202 in this embodiment of this application, refer to the implementations of the step S101 and the step S102 in Embodiment 1. Details are not described herein again.

S203: The beamformee sends a beamforming report. The beamforming report includes a first parameter. The first parameter includes a first RSSI and a first receive antenna index. The first parameter is determined based on RSSIs of a plurality of receive antennas when the beamformee receives the NDP. The first parameter is used for power control.

S204: The beamformer receives the beamforming report.

Optionally, the beamforming report (BFR) is an action frame (Action No ACK frame) that does not need to be acknowledged. The beamforming report includes a MIMO control field indicating parameters of the beamforming report. In addition, the beamforming report further includes one or more fields such as a compressed beamforming report, a multi-user-specific beamforming report, and a channel quality information report. The compressed beamforming report includes an average SNR of each spatial stream, and a compressed beamforming feedback matrix V based on every Ng (Number of grouping, a number of groups, where Ng=4 or 16) subcarriers of each spatial stream. The multi-user-specific beamforming report includes a difference between the average SNR and an SNR based on every Ng subcarriers of each spatial stream.

Optionally, the beamforming report alternatively includes a first parameter. The first parameter includes a first RSSI and a first receive antenna index. The first RSSI is a largest RSSI of the plurality of receive antennas when the beamformee receives the NDP, and the first antenna index is an index of a receive antenna corresponding to the first RSSI. The first parameter is used to determine power control parameters of the plurality of spatial streams based on a first RSSI threshold. The power control parameters of the plurality of spatial streams are used for power control or used to adjust transmit power of each spatial stream when a data signal is subsequently sent. The first RSSI threshold is an RSSI threshold of a receive antenna identified by the first antenna index, and is determined based on a low-noise amplifier characteristic of the receive antenna identified by the first antenna index. For a receive antenna, because an RSSI threshold is a parameter related to a radio frequency characteristic, the beamformee (for example, a STA) may feed back an RSSI threshold of each receive antenna of the beamformee in an association process with the beamformer (for example, an AP). In addition, the RSSI threshold of each receive antenna needs to be fed back only once (that is, the RSSI threshold of each receive antenna does not need to be repeatedly fed back) for future use.

Optionally, the first parameter may further include a first RSSI threshold. The first RSSI threshold is an RSSI threshold of a receive antenna corresponding to the first RSSI. The first RSSI threshold may be determined based on a low-noise amplifier characteristic of the receive antenna. It should be understood that, when the first parameter further includes the first RSSI threshold, the first parameter may be directly used to determine power control parameters of the plurality of spatial streams. The power control parameters of the plurality of spatial streams are used for power control or used to adjust transmit power of each spatial stream when a data signal is subsequently sent.

Optionally, the first parameter (including the first RSSI and the first receive antenna index, or including the first RSSI, the first receive antenna index, and the first RSSI threshold) may be independently included in the beamforming report, or may be included in one or more fields such as the compressed beamforming report, the multi-user-specific beamforming report, and the channel quality information report.

Optionally, after the step S201, the beamformer may further send a beamforming report poll trigger (BFRP trigger) frame. The BFRP trigger frame is used to trigger the beamformee (for example, the station) to feed back the beamforming report.

Specifically, when receiving the NDP, the beamformee measures (or obtains) an RSSI of each receive antenna (the obtained RSSI herein is an RSSI when all spatial streams are mixed for receiving). Then, the beamformee determines the largest RSSI from the RSSIs of the plurality of receive antennas. The largest RSSI is denoted as the first RSSI (or RSSI, where j is an index of a receive antenna with the largest RSSI measured when the beamformee receives the NDP). The index of the receive antenna corresponding to the first RSSI is denoted as the first antenna index (or j). Optionally, the beamformee obtains the first RSSI threshold (denoted as $RSSIX_j$) corresponding to the first antenna index. The first RSSI threshold is determined based on the low-noise amplifier characteristic of the receive antenna. It should be understood that one receive antenna corresponds to one RSSI threshold. If the first RSSI is greater than the first RSSI threshold, the beamformee carries the first RSSI (that is, $RSSI_j$) and the first antenna index (that is, j) in the beamforming report, optionally, further carries the first RSSI threshold (that is, $RSSIX_j$), and sends the beamforming report. Correspondingly, the beamformer receives the beamforming report.

Optionally, because RSSIs are different on all subcarriers, only a largest average value may be fed back on an entire bandwidth (all subcarriers). In other words, the first RSSI is a largest average value in average values of RSSIs on the entire bandwidth (or all subcarriers). For example, an entire bandwidth of 20 MHz is used as an example. 256 subcarriers (subcarrier indexes range from −128 to 127, that is, −128, . . . , −1, 0, 1, . . . , 127) are included in total, and four subcarriers or 16 subcarriers are usually used as a group for feedback. When Ng (a number of groups) is 4 (four subcarriers form a group), indexes of subcarriers that need to be fed back are [−122, −120:4:−4, −2, 2, 4:4:120, 122], and there are 64 subcarriers in total. First, for each receive antenna, an average value of RSSIs of the 64 subcarriers (subcarrier indexes are respectively [−122, −120:4:−4, −2, 2, 4:4:120, 122]) is calculated, and then a largest average value (that is, the first RSSI) in average values of the RSSIs is determined from average values of RSSIs of all receive antennas. The first receive antenna index is an index of a receive antenna corresponding to the largest average value in the average values of the RSSIs. Alternatively, the largest average value may be fed back in a unit of 10 MHz, 5 MHz, 20 MHz, or the like based on a sub-bandwidth. For the RSSI threshold of the receive antenna, only one largest average value may be fed back on an entire bandwidth.

It can be learned that in this embodiment of this application, only the beamforming report carries the first RSSI and the first receive antenna index, and optionally, the first RSSI threshold is carried. A small amount of information is carried, so that signaling overheads can be reduced, and calculation complexity of the beamformee can be reduced.

Optionally, after the step S204, the power control method in a wireless local area network further includes the following steps.

S205: The beamformer determines the power control parameters of the plurality of spatial streams based on the first RSSI and the first receive antenna index that are included in the first parameter, or further based on the first RSSI threshold.

Specifically, the first parameter includes the first RSSI (that is, $RSSI_j$) and the first receive antenna index (that is, j), and optionally further includes the first RSSI threshold (that is, $RSSIX_j$). After receiving the beamforming report, the beamformer obtains the first parameter from the beamforming report. If the first parameter does not include the first RSSI threshold (that is, $RSSIX_j$), the beamformer may obtain (or request from the beamformer) the first RSSI threshold (that is, $RSSIX_j$) corresponding to the first receive antenna index from a local storage device. The beamformer calculates a power control parameter of each of the plurality of spatial streams based on the first antenna index (that is, j) and a difference (that is, $RSSI_j-RSSIX_j$) between the first RSSI and the first RSSI threshold.

For an implementation in which the beamformer calculates the power control parameter of each of the plurality of spatial streams based on the first antenna index (that is, j) and the difference (that is, $RSSI_j-RSSIX_j$) between the first RSSI and the first RSSI threshold, refer to corresponding descriptions of the first implementation of the step S103 in Embodiment 1.

It should be understood that the beamforming report carries channel state information of a receive end and a transmit end. Therefore, the beamformer may also calculate a mapping function from a receive antenna to a spatial stream based on the channel state information of the receive end and the transmit end, to obtain the power control parameter of each spatial stream according to the foregoing formula (1-1).

S206: The beamformer sends the data signal based on the power control parameter.

Correspondingly, the beamformee receives the data signal sent by the beamformer based on the power control parameter.

Specifically, for an implementation of the step S206 in this embodiment of this application, refer to the implementation of the step S106 in Embodiment 1. Details are not described herein again.

It can be learned that the beamformee in this embodiment of this application feeds back the RSSI of the receive antenna, the receive antenna index, and the RSSI threshold in the beamforming report, and the beamformer calculates the power adjustment parameter of each spatial stream based on feedback of the beamformee, and adjusts the transmit power of each spatial stream when the data signal is subsequently sent, to indirectly reduce the RSSI of the receive antenna of the beamformee, and to reduce total transmit power as a whole when the SNR of the spatial stream with good channel quality is not affected. At the receive end (that is, the beamformee), power of all spatial streams may be centrally amplified by using a power amplifier, to improve an SNR of a spatial stream with an original worse SNR (that is, a bottleneck spatial stream). In this way, a higher-order modulation scheme in a case of a larger number of spatial streams is implemented, to achieve a large number of spatial streams and a high modulation order. This improves a system throughput.

The foregoing content describes in detail the methods provided in this application. To facilitate implementation of the foregoing solutions in embodiments of this application, embodiments of this application further provide corresponding apparatuses or devices.

In embodiments of this application, division of functional modules may be performed on a beamformer and a beamformee based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used. The following describes in detail communication apparatuses in embodiments of this application with reference to FIG. 7 to FIG. 9. The communication apparatus is the beamformer or the beamformee. Further, the communication apparatus may be an apparatus in the beamformer. Alternatively, the communication apparatus is an apparatus in the beamformee.

Figure 7:
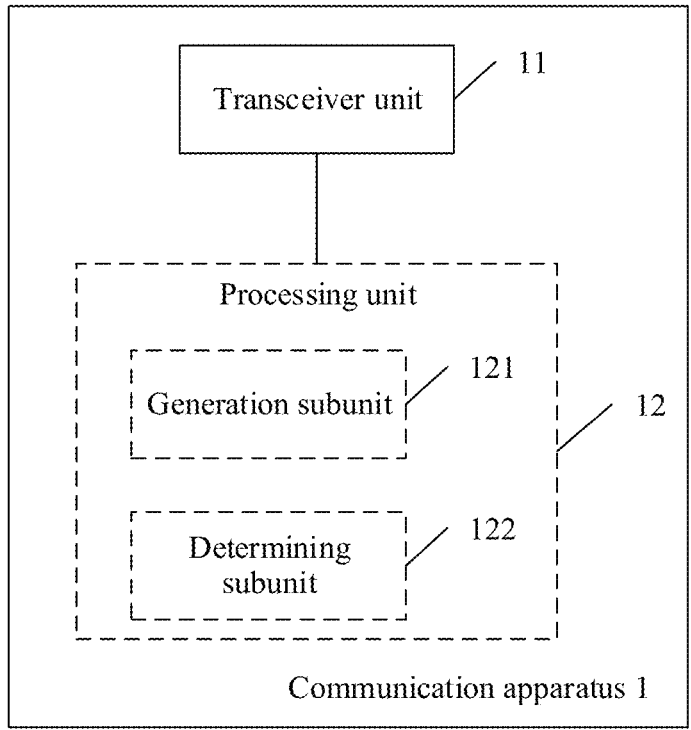
FIG. 7 is a schematic diagram of a structure of a communication apparatus 1 according to an embodiment of this application.

When an integrated unit is used, FIG. 7 is a schematic diagram of a structure of a communication apparatus 1 according to an embodiment of this application. The communication apparatus 1 may be the beamformer or a chip in the beamformer, for example, a Wi-Fi chip. As shown in FIG. 7, the communication apparatus 1 includes a transceiver unit 11, and optionally includes a processing unit 12.

The transceiver unit 11 is configured to send a null data packet NDP. The transceiver unit 11 is further configured to receive a beamforming report. The beamforming report includes a first parameter. The first parameter is determined based on received signal strength indicators RSSIs of a plurality of receive antennas when the beamformee receives the NDP. Alternatively, the first parameter is determined based on signal to noise ratios SNRs of a plurality of spatial streams when the beamformee receives the NDP. The first parameter is used for power control.

Optionally, the processing unit 12 includes a generation subunit 121. The generation subunit 121 is configured to generate the NDP.

Optionally, the processing unit 12 includes a determining subunit 122. The determining subunit 122 is configured to determine power control parameters of the plurality of spatial streams based on the first parameter. The transceiver unit 11 is further configured to send a data signal based on the power control parameter.

Optionally, the transceiver unit 11 is further configured to send a null data packet announcement NDPA frame. The NDPA frame includes indication information. The indication information indicates whether the beamformee feeds back the first parameter.

It should be understood that the communication apparatus 1 may correspondingly perform Embodiment 1 or Embodiment 2, and the foregoing operations or functions of the units in the communication apparatus 1 are respectively configured to implement corresponding operations of the beamformer in Embodiment 1 or Embodiment 2. For brevity, details are not described herein again.

Figure 8:
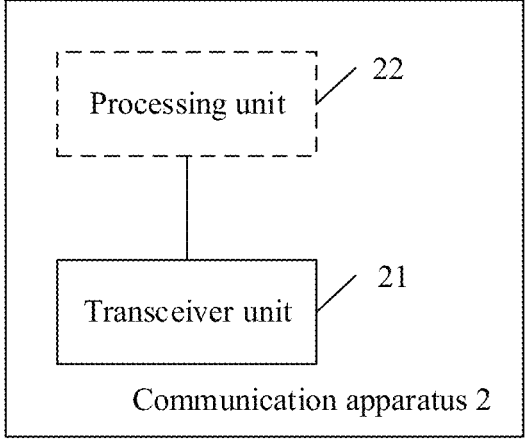
FIG. 8 is a schematic diagram of a structure of a communication apparatus 2 according to an embodiment of this application.

FIG. 8 is a schematic diagram of a structure of a communication apparatus 2 according to an embodiment of this application. The communication apparatus 2 may be the beamformee or a chip in the beamformee, for example, a Wi-Fi chip. As shown in FIG. 8, the communication apparatus 2 includes a transceiver unit 21, and optionally includes a processing unit 22.

The transceiver unit 21 is configured to receive an NDP. The transceiver unit 21 is further configured to send a beamforming report. The beamforming report includes a first parameter. The first parameter is determined based on RSSIs of a plurality of receive antennas when the beamformee receives the NDP. Alternatively, the first parameter is determined based on SNRs of a plurality of spatial streams when the beamformee receives the NDP. The first parameter is used for power control.

Optionally, the processing unit 22 is configured to obtain the first parameter and generate the beamforming report.

Optionally, the transceiver unit 21 is further configured to receive a data signal sent by the beamformer based on a power control parameter. The power control parameter is determined based on the first parameter.

Optionally, the transceiver unit 21 is further configured to receive an NDPA frame. The NDPA frame includes indication information. The indication information indicates whether the beamformee feeds back the first parameter.

It should be understood that the communication apparatus 2 may correspondingly perform Embodiment 1 or Embodiment 2, and the foregoing operations or functions of the units in the communication apparatus 2 are respectively configured to implement corresponding operations of the beamformee in Embodiment 1 or Embodiment 2. For brevity, details are not described herein again.

The foregoing describes the beamformer and the beamformee in embodiments of this application. The following describes possible product forms of the beamformer and the beamformee. It should be understood that any product in any form that has a function of the beamformer in FIG. 7 and any product in any form that has a function of the beamformee in FIG. 8 fall within the protection scope of embodiments of this application. It should be further understood that the following description is merely an example, and the product forms of the beamformer and the beamformee in embodiments of this application are not limited thereto.

In a possible product form, the beamformer and the beamformee in embodiments of this application may be implemented by using a general bus architecture.

Figure 9:
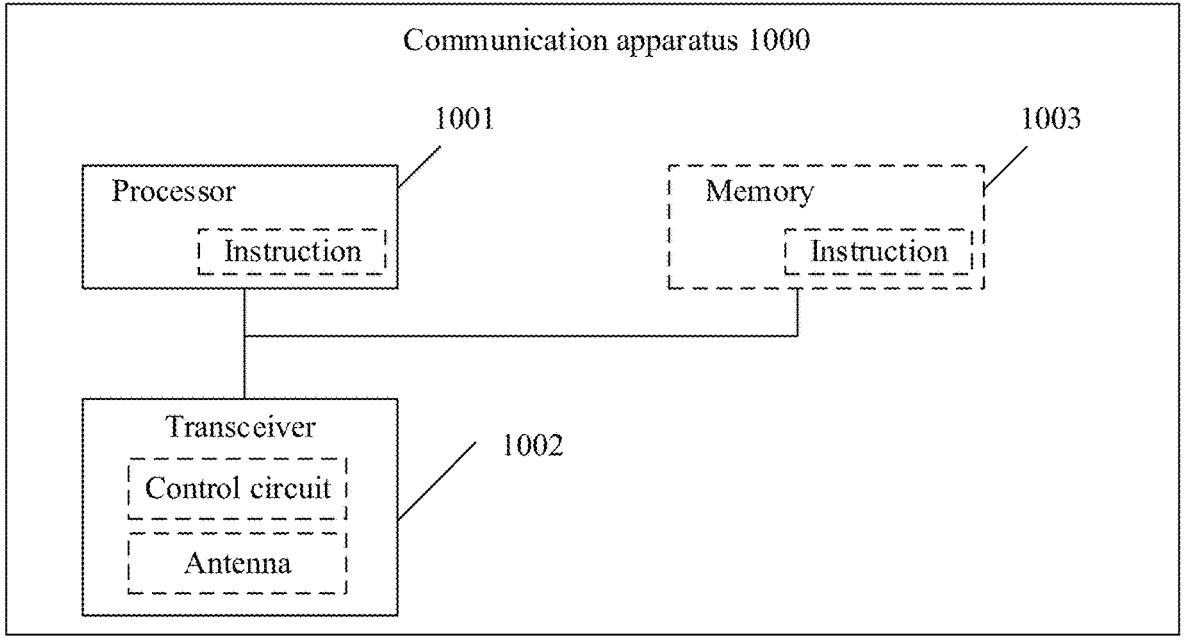
FIG. 9 is a schematic diagram of a structure of a communication apparatus 1000 according to an embodiment of this application.

For ease of description, FIG. 9 is a schematic diagram of a structure of a communication apparatus 1000 according to an embodiment of this application. The communication apparatus 1000 may be the beamformer, the beamformee, or a chip therein. FIG. 9 shows only main components of the communication apparatus 1000. In addition to a processor 1001 and a transceiver 1002, the communication apparatus may further include a memory 1003 and an input/output apparatus (not shown in the figure).

The processor 1001 is mainly configured to process a communication protocol and communication data, control the entire communication apparatus, execute a software program, and process data of the software program. The memory 1003 is mainly configured to store the software program and the data. The transceiver 1002 may include a control circuit and an antenna. The control circuit is mainly configured to perform conversion between a baseband signal and a radio frequency signal and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

After the communication apparatus is powered on, the processor 1001 may read the software program in the memory 1003, interpret and execute instructions of the software program, and process the data of the software program. When data needs to be sent wirelessly, after performing baseband processing on the to-be-sent data, the processor 1001 outputs a baseband signal to a radio frequency circuit. After performing radio frequency processing on the baseband signal, the radio frequency circuit sends a radio frequency signal in a form of an electromagnetic wave through the antenna. When data is sent to the communication apparatus, the radio frequency circuit receives a radio frequency signal through the antenna, converts the radio frequency signal into a baseband signal, and outputs the baseband signal to the processor 1001. The processor 1001 converts the baseband signal into data and processes the data.

In another implementation, the radio frequency circuit and the antenna may be disposed independent of the processor that performs baseband processing. For example, in a distributed scenario, the radio frequency circuit and the antenna may be separately disposed independent of the communication apparatus.

The processor 1001, the transceiver 1002, and the memory 1003 may be connected through a communication bus.

In a design, the communication apparatus 1000 may be configured to perform a function of the beamformer in Embodiment 1. The processor 1001 may be configured to generate the NDP sent in the step S101 in FIG. 4, or configured to perform the step S105 in FIG. 4, and/or configured to perform another process of the technology described in this specification. The transceiver 1002 may be configured to perform the steps S101, S104, and S106 in FIG. 4, and/or configured to perform another process of the technology described in this specification.

In another design, the communication apparatus 1000 may be configured to perform a function of the beamformee in Embodiment 1. The processor 1001 may be configured to generate the beamforming report sent in the step S103 in FIG. 4, and/or configured to perform another process of the technology described in this specification. The transceiver 1002 may be configured to perform the steps S102 and S103 in FIG. 4, and/or configured to perform another process of the technology described in this specification.

In a design, the communication apparatus 1000 may be configured to perform a function of the beamformer in Embodiment 2. The processor 1001 may be configured to generate the NDP sent in the step S201 in FIG. 6, or configured to perform the step S205 in FIG. 6, and/or configured to perform another process of the technology described in this specification. The transceiver 1002 may be configured to perform the steps S201, S204, and S206 in FIG. 6, and/or configured to perform another process of the technology described in this specification.

In another design, the communication apparatus 1000 may be configured to perform a function of the beamformee in Embodiment 2. The processor 1001 may be configured to generate the beamforming report sent in the step S203 in FIG. 6, and/or configured to perform another process of the technology described in this specification. The transceiver 1002 may be configured to perform the steps S202 and S203 in FIG. 6, and/or configured to perform another process of the technology described in this specification.

In any one of the foregoing designs, the processor 1001 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1001 may store instructions. The instructions may be a computer program. The computer program is run on the processor 1001, so that the communication apparatus 1000 can perform the method described in any one of the foregoing method embodiments. The computer program may be fixed in the processor 1001. In this case, the processor 1001 may be implemented by hardware.

In an implementation, the communication apparatus 1000 may include a circuit, and the circuit may implement a sending, receiving, or communication function in the foregoing method embodiments. The processor and the transceiver described in this application may be implemented in an integrated circuit (integrated circuit, IC), an analog IC, a radio frequency integrated circuit RFIC, a mixed-signal IC, an application-specific integrated circuit (application-specific integrated circuit, ASIC), or a printed circuit board (printed circuit board, PCB), an electronic device, and the like. The processor and the transceiver may alternatively be manufactured by using various IC technologies, for example, a complementary metal oxide semiconductor (complementary metal oxide semiconductor, CMOS), an N-type metal oxide semiconductor (N-channel Metal-oxide-semiconductor, NMOS), a P-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

A scope of the communication apparatus described in this application is not limited thereto, and a structure of the communication apparatus may not be limited by FIG. 9. The communication apparatus may be an independent device or may be a part of a large device. For example, the communication apparatus may be:

(1) an independent integrated circuit IC, a chip, or a chip system or subsystem;

(2) a set including one or more ICs, where optionally, the IC set may further include a storage component configured to store data and a computer program;

(3) an ASIC, for example, a modem (Modem);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) another device or the like.

In a possible product form, the beamformer and the beamformee in embodiments of this application may be implemented by using a general-purpose processor.

The general-purpose processor for implementing the beamformer includes a processing circuit and an input/output interface that is internally connected to and communicates with the processing circuit.

In a design, the general-purpose processor may be configured to perform a function of the beamformer in Embodiment 1. Specifically, the processing circuit may be configured to generate the NDP sent in the step S101 in FIG. 4, or configured to perform the step S105 in FIG. 4, and/or configured to perform another process of the technology described in this specification. The input/output interface is configured to perform the steps S101, S104, and S106 in FIG. 4, and/or configured to perform another process of the technology described in this specification.

In another design, the general-purpose processor may be configured to perform a function of the beamformer in Embodiment 2. Specifically, the processing circuit may be configured to generate the NDP sent in the step S201 in FIG. 6, or configured to perform the step S205 in FIG. 6, and/or configured to perform another process of the technology described in this specification. The input/output interface is configured to perform the steps S201, S204, and S206 in FIG. 6, and/or configured to perform another process of the technology described in this specification.

The general-purpose processor for implementing the beamformee includes a processing circuit and an input/output interface that is internally connected to and communicates with the processing circuit.

In a design, the general-purpose processor may be configured to perform a function of the beamformee in Embodiment 1. Specifically, the processing circuit may be configured to generate the beamforming report sent in the step S103 in FIG. 4, and/or configured to perform another process of the technology described in this specification. The input/output interface is configured to perform the steps S102 and S103 in FIG. 4, and/or configured to perform another process of the technology described in this specification.

In another design, the general-purpose processor may be configured to perform a function of the beamformee in Embodiment 2. Specifically, the processing circuit may be configured to generate the beamforming report sent in the step S203 in FIG. 6, and/or configured to perform another process of the technology described in this specification. The input/output interface is configured to perform the steps S202 and S203 in FIG. 6, and/or configured to perform another process of the technology described in this specification.

It should be understood that the communication apparatuses in the foregoing various product forms have any function of the beamformer or the beamformee in the foregoing method embodiments. Details are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

An embodiment of this application further provides a wireless communication system, including a beamformer and a beamformee. The beamformer and the beamformee may perform the method in any one of the foregoing embodiments.

Method or algorithm steps described in combination with the content disclosed in this application may be implemented by hardware, or may be implemented by a processor by executing software instructions. The software instruction may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer-readable storage medium and a communication medium. The communication medium includes any medium that facilitates transmission of a computer program from one place to another. The storage medium may be any available medium accessible to a general-purpose or dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A power control method in a wireless local area network, comprising:

receiving, by a beamformee, a null data packet (NDP) sent by a beamformer;

determining, by a beamformee, a first parameter based on received signal strength indicators (RSSIs) of a plurality of receive antennas of the beamformee when the beamformee receives the NDP, or based on signal to noise ratios (SNRs) of a plurality of spatial streams when the beamformee receives the NDP, wherein the first parameter is for power control, wherein the first parameter comprises power control parameters of the plurality of spatial streams, a first power control parameter is generated by the beamformee based on a first RSSI, a first RSSI threshold, and a first antenna index, the first RSSI is a largest RSSI of the plurality of receive antennas when the beamformee receives the NDP, the first antenna index is an index of a receive antenna corresponding to the first RSSI, and the first RSSI threshold is an RSSI threshold of the receive antenna corresponding to the first RSSI;

generating, by the beamformee, a beamforming report comprising the first parameter; and sending, by the beamformee, the beamforming report to the beamformer.

2. The method according to claim 1, wherein a power control parameter of an $i^{th}$ spatial stream in the plurality of spatial streams is:

$$PC_i = f(RSSI_j - RSSIX_j), \text{ wherein}$$

PC$_i$ indicates the power control parameter of the i$^{th}$ spatial stream, a value of i falls within a range [1, N], and N is a number of spatial streams used when the beamformer sends the NDP;

f( ) indicates a mapping function from a j$^{th}$ receive antenna to a spatial stream, RSSI$_j$ indicates an RSSI of the j$^{th}$ receive antenna, j is an index of a receive antenna with the largest RSSI when the beamformee receives the NDP, and RSSIX$_j$ indicates an RSSI threshold of the j$^{th}$ receive antenna; and f( ) is determined based on channel state information of the j$^{th}$ receive antenna, and the channel state information is determined based on a long training sequence in the NDP.

3. The method according to claim 1, wherein the first parameter comprises a first RSSI and a first receive antenna index of the beamformee, the first RSSI is a largest RSSI of the plurality of receive antennas of the beamformee when the beamformee receives the NDP, and the first receive antenna index is an index of a receive antenna of the beamformee corresponding to the first RSSI.

4. The method according to claim 3, wherein the first parameter further comprises a first RSSI threshold, and the first RSSI threshold is an RSSI threshold corresponding to the first receive antenna index of the beamformee.

5. The method according to claim 1, wherein the first parameter comprises power control parameters of the plurality of spatial streams, and a power control parameter of an i$^{th}$ spatial stream in the plurality of spatial streams is determined based on an SNR of the i$^{th}$ spatial stream when the beamformee receives the NDP, a smallest SNR in the SNRs of the plurality of spatial streams when the beamformee receives the NDP, and a preset value.

6. The method according to claim 5, wherein the power control parameter of the i$^{th}$ spatial stream meets a condition of:

$$SNR_i - PC_i \leq SNR_{min} + \text{preset value},$$

wherein SNR$_i$ indicates the SNR of the i$^{th}$ spatial stream when the beamformee receives the NDP, a value of i falls within a range [1, N], N is a number of spatial streams used when the beamformer sends the NDP, PC$_i$ indicates the power control parameter of the i$^{th}$ spatial stream, and SNR$_{min}$ indicates the smallest SNR in the SNRs of the plurality of spatial streams when the beamformee receives the NDP.

7. The method according to claim 1, wherein the NDP comprises indication information indicating the beamformer whether to send the first parameter.

8. A communication apparatus comprising:

a transceiver comprising a plurality of receiving antennas;

a memory storing executable instructions; and a processor configured to execute the executable instructions to:

receive, by using the transceiver; a null data packet (NDP) sent by a beamformer;

determine a first parameter based on received signal strength indicators (RSSIs) of the plurality of receive antennas when the communication apparatus receives the NDP, or based on signal to noise ratios (SNRs) of a plurality of spatial streams when the communication apparatus receives the NDP, wherein the first parameter is for power control, wherein the first parameter comprises power control parameters of the plurality of spatial streams, wherein the processor is configured to generate a first power control parameter based on a first RSSI, a first RSSI threshold, and a first antenna index, the first RSSI is a largest RSSI of the plurality of receive antennas when the communication apparatus receives the NDP, the first antenna index is an index of a receive antenna corresponding to the first RSSI, and the first RSSI threshold is an RSSI threshold of the receive antenna corresponding to the first RSSI;

generate a beamforming report comprising the first parameter; and send, by using the transceiver, the beamforming report to the beamformer.

9. The communication apparatus according to claim 8, wherein a power control parameter of an i$^{th}$ spatial stream in the plurality of spatial streams is:

$$PC_i = f(RSSI_j - RSSIX_j), \text{ wherein}$$

PC$_i$ indicates the power control parameter of the i$^{th}$ spatial stream, a value of i falls within a range [1, N], and N is a number of spatial streams used when the communication apparatus sends the NDP;

f( ) indicates a mapping function from a j$^{th}$ receive antenna to a spatial stream, RSSI$_j$ indicates an RSSI of the j$^{th}$ receive antenna, j is an index of a receive antenna with the largest RSSI when the communication apparatus receives the NDP, and RSSIX$_j$ indicates an RSSI threshold of the j$^{th}$ receive antenna; and f( ) is determined based on channel state information of the j$^{th}$ receive antenna, and the channel state information is determined based on a long training sequence in the NDP.

10. The communication apparatus according to claim 8, wherein the first parameter comprises a first RSSI and a first receive antenna index of the communication apparatus, the first RSSI is a largest RSSI of the plurality of receive antennas of the communication apparatus when the communication apparatus receives the NDP, and the first receive antenna index is an index of a receive antenna of the communication apparatus corresponding to the first RSSI.

11. The communication apparatus according to claim 10, wherein the first parameter further comprises a first RSSI threshold, and the first RSSI threshold is an RSSI threshold corresponding to the first receive antenna index of the communication apparatus.

12. The communication apparatus according to claim 8, wherein the first parameter comprises power control parameters of the plurality of spatial streams, and a power control parameter of an i$^{th}$ spatial stream in the plurality of spatial streams is determined based on an SNR of the i$^{th}$ spatial stream when the communication apparatus receives the NDP, a smallest SNR in the SNRs of the plurality of spatial streams when the communication apparatus receives the NDP, and a preset value.

13. The communication apparatus according to claim 12, wherein the power control parameter of the i$^{th}$ spatial stream meets a condition of:

$$SNR_i - PC_i \leq SNR_{min} + \text{preset value},$$

wherein SNR$_i$ indicates the SNR of the i$^{th}$ spatial stream when the communication apparatus receives the NDP, a value of i falls within a range [1, N], N is a number of spatial streams used when the beamformer sends the NDP, PC$_i$ indicates the power control parameter of the i$^{th}$ spatial stream, and SNR$_{min}$ indicates the smallest SNR in the SNRs of the plurality of spatial streams when the communication apparatus receives the NDP.

14. The communication apparatus according to claim 8, wherein the NDP comprises indication information indicating the beamformer whether to send the first parameter.

15. A non-transitory computer-readable storage medium comprising a computer program code that, when executed by a processor of a beamformee, cause the beamformee to perform a method including:

receiving a null data packet (NDP) sent by a beamformer;

determining a first parameter based on received signal strength indicators (RSSIs) of a plurality of receive antennas of the beamformee when the beamformee receives the NDP, or based on signal to noise ratios (SNRs) of a plurality of spatial streams when the beamformee receives the NDP, wherein the first parameter is for power control, wherein the first parameter comprises power control parameters of the plurality of spatial streams, a first power control parameter is generated by the beamformee based on a first RSSI, a first RSSI threshold, and a first antenna index, the first RSSI is a largest RSSI of the plurality of receive antennas when the beamformee receives the NDP, the first antenna index is an index of a receive antenna corresponding to the first RSSI, and the first RSSI threshold is an RSSI threshold of the receive antenna corresponding to the first RSSI;

generating a beamforming report comprising the first parameter; and sending the beamforming report to the beamformer.

16. The non-transitory computer-readable storage medium of claim 15, wherein a power control parameter of an $i^{th}$ spatial stream in the plurality of spatial streams is:

$$PC_i = f(RSSI_j - RSSIX_j), \text{ wherein}$$

$PC_i$ indicates the power control parameter of the $i^{th}$ spatial stream, a value of i falls within a range [1, N], and N is a number of spatial streams used when the beamformer sends the NDP;

$f(\ )$ indicates a mapping function from a $j^{th}$ receive antenna to a spatial stream, $RSSI_j$ indicates an RSSI of the $j^{th}$ receive antenna, j is an index of a receive antenna with the largest RSSI when the beamformee receives the NDP, and $RSSIX_j$ indicates an RSSI threshold of the $j^{th}$ receive antenna; and $f(\ )$ is determined based on channel state information of the $j^{th}$ receive antenna, and the channel state information is determined based on a long training sequence in the NDP.

17. The non-transitory computer-readable storage medium of claim 15, wherein the first parameter comprises a first RSSI and a first receive antenna index of the beamformee, the first RSSI is a largest RSSI of the plurality of receive antennas of the beamformee when the beamformee receives the NDP, and the first receive antenna index is an index of a receive antenna of the beamformee corresponding to the first RSSI.

18. The non-transitory computer-readable storage medium of claim 15, wherein the first parameter further comprises a first RSSI threshold, and the first RSSI threshold is an RSSI threshold corresponding to the first receive antenna index of the beamformee.

19. The non-transitory computer-readable storage medium of claim 15, wherein the first parameter comprises power control parameters of the plurality of spatial streams, and a power control parameter of an $i^{th}$ spatial stream in the plurality of spatial streams is determined based on an SNR of the $i^{th}$ spatial stream when the beamformee receives the NDP, a smallest SNR in the SNRs of the plurality of spatial streams when the beamformee receives the NDP, and a preset value.

20. The non-transitory computer-readable storage medium of claim 19, wherein the power control parameter of the $i^{th}$ spatial stream meets a condition of:

$$SNR_i - PC_i \leq SNR_{min} + \text{preset value,}$$

wherein $SNR_i$ indicates the SNR of the $i^{th}$ spatial stream when the beamformee receives the NDP, a value of i falls within a range [1, N], N is a number of spatial streams used when the beamformer sends the NDP, $PC_i$ indicates the power control parameter of the $i^{th}$ spatial stream, and $SNR_{min}$ indicates the smallest SNR in the SNRs of the plurality of spatial streams when the beamformee receives the NDP.

* * * * *